United States Patent
Meggiolan

(10) Patent No.: US 11,148,466 B2
(45) Date of Patent: Oct. 19, 2021

(54) INSERT FOR A RIM OF A SPOKED WHEEL FOR BICYCLE AND RESPECTIVE SPOKED WHEEL FOR BICYCLE

(71) Applicant: Campagnolo S.r.l., Vicenza (IT)

(72) Inventor: Mario Meggiolan, Creazzo (IT)

(73) Assignee: CAMPAGNOLO S.R.L., Vicenza (IT)

( * ) Notice: Subject to any disclaimer, the term of this patent is extended or adjusted under 35 U.S.C. 154(b) by 375 days.

(21) Appl. No.: 16/205,998

(22) Filed: Nov. 30, 2018

(65) Prior Publication Data

US 2019/0168536 A1  Jun. 6, 2019

(30) Foreign Application Priority Data

Dec. 5, 2017  (IT) .......................... 102017000140052

(51) Int. Cl.
| | |
|---|---|
| *B60B 1/04* | (2006.01) |
| *B60B 21/06* | (2006.01) |
| *B60B 21/02* | (2006.01) |
| *B60B 1/00* | (2006.01) |

(52) U.S. Cl.
CPC .............. *B60B 1/041* (2013.01); *B60B 1/003* (2013.01); *B60B 1/044* (2013.01); *B60B 1/045* (2013.01); *B60B 1/046* (2013.01); *B60B 1/047* (2013.01); *B60B 21/062* (2013.01); *B60B 21/025* (2013.01); *B60B 21/068* (2013.01); *B60B 2310/204* (2013.01); *B60B 2320/122* (2013.01); *B60B 2360/10* (2013.01); *B60B 2360/102* (2013.01); *B60B 2360/141* (2013.01); *B60B 2360/32* (2013.01); *B60B 2360/3416* (2013.01); *B60B 2360/36* (2013.01); *B60B 2360/50* (2013.01); *B60B 2900/1216* (2013.01); *B60B 2900/311* (2013.01); *B60Y 2200/13* (2013.01)

(58) Field of Classification Search
CPC ......... B60B 1/003; B60B 1/041; B60B 1/044; B60B 21/062; B60B 21/025; B60B 2360/10; B60B 2360/50
See application file for complete search history.

(56) References Cited

U.S. PATENT DOCUMENTS

| | | |
|---|---|---|
| 1,402,434 A | 1/1922 | Mott |
| 5,894,767 A | 4/1999 | Wridt |
| 6,938,962 B1 * | 9/2005 | Schlanger .............. B60B 1/041 |
| | | 301/58 |
| 7,140,696 B1 | 11/2006 | Guzik et al. |
| 2007/0057566 A1 | 3/2007 | Cappellotto |
| 2007/0080577 A1 | 4/2007 | Fioravanti |

(Continued)

FOREIGN PATENT DOCUMENTS

| | | |
|---|---|---|
| DE | 202 17 436 U1 | 3/2003 |
| EP | 2 272 684 A2 | 1/2011 |

(Continued)

OTHER PUBLICATIONS

Italian Search Report and Written Opinion in Italian Application No. 10201700140052, dated Jul. 25, 2018, with English translation.

(Continued)

*Primary Examiner* — Kip T Kotter

(74) *Attorney, Agent, or Firm* — Volpe Koenig

(57) ABSTRACT

An insert for the rim of a spoked bicycle wheel that has a spoke hole. The insert has a portion configured to abut against a spoke attachment element with an enlarged head and a holding element that prevents movement of the spoke attachment along said longitudinal axis of the spoke hole.

16 Claims, 15 Drawing Sheets

(56) References Cited

U.S. PATENT DOCUMENTS

| | | | |
|---|---|---|---|
| 2007/0158996 A1 | | 7/2007 | Meggiolan et al. |
| 2008/0007110 A1 | * | 1/2008 | Tien ........................ B60B 1/044 |
| | | | 301/59 |
| 2008/0054713 A1 | * | 3/2008 | Spahr .................... B60B 21/025 |
| | | | 301/58 |
| 2008/0290721 A1 | * | 11/2008 | Wang ...................... B60B 1/047 |
| | | | 301/58 |
| 2010/0096907 A1 | * | 4/2010 | Cappellotto ............ B60B 1/047 |
| | | | 301/55 |
| 2012/0212036 A1 | | 8/2012 | Goto |
| 2015/0054333 A1 | | 2/2015 | Chen |

FOREIGN PATENT DOCUMENTS

| | | |
|---|---|---|
| EP | 2 422 959 A1 | 2/2012 |
| EP | 3 225 384 A1 | 10/2017 |
| FR | 2 702 707 A1 | 9/1994 |
| FR | 2 813 558 A1 | 3/2002 |
| FR | 2813558 A1 * 3/2002 | ........... B60B 21/064 |
| FR | 2 988 330 A1 | 9/2013 |
| WO | 93/09963 A1 | 5/1993 |
| WO | WO-2006070415 A1 * 7/2006 | ............. B60B 1/044 |

OTHER PUBLICATIONS

Italian Search Report and Written Opinion in Italian Application No. 10201700140044, dated Jul. 25, 2018, with English translation.
European Office Action for App. No. 18 208 631.4, dated Oct. 23, 2020.
European Office Action received in counterpart European Application No. 18 208 491.3-1009, dated Apr. 29, 2020.

\* cited by examiner

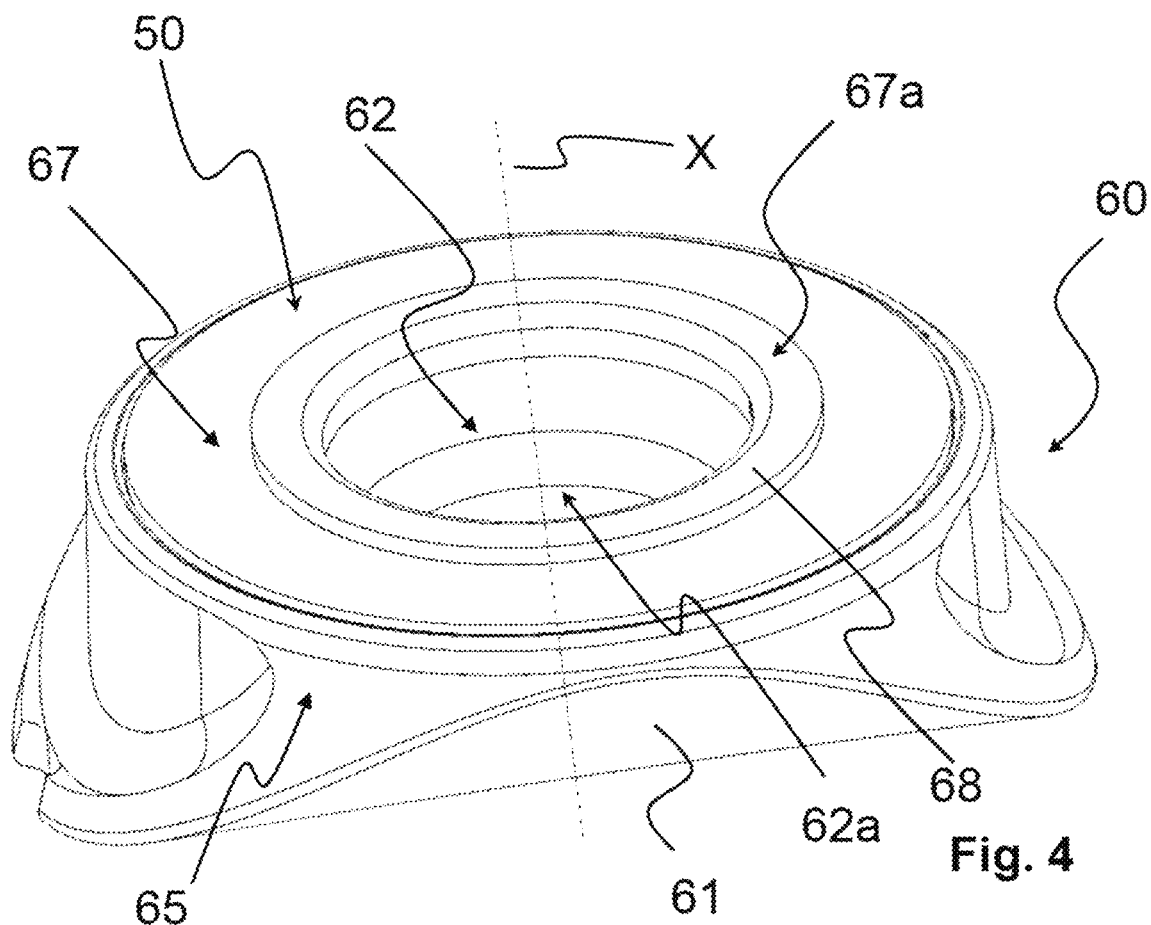
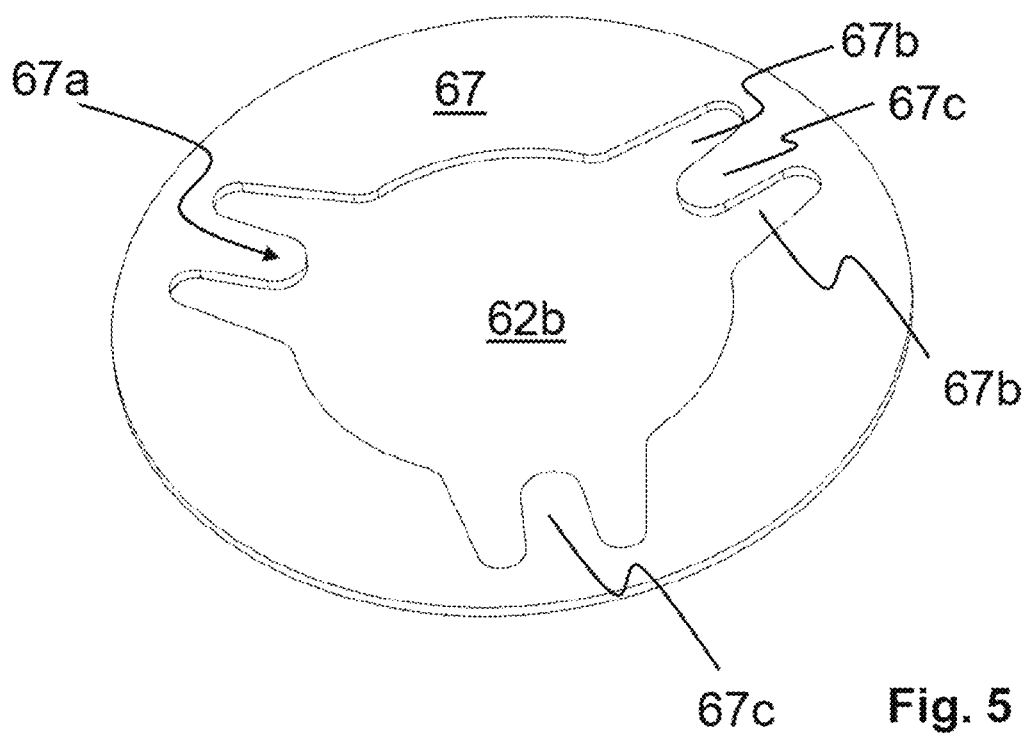

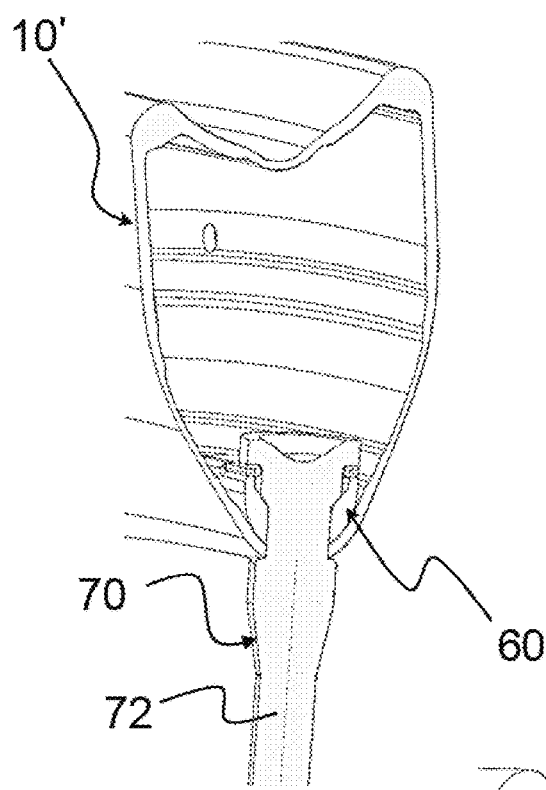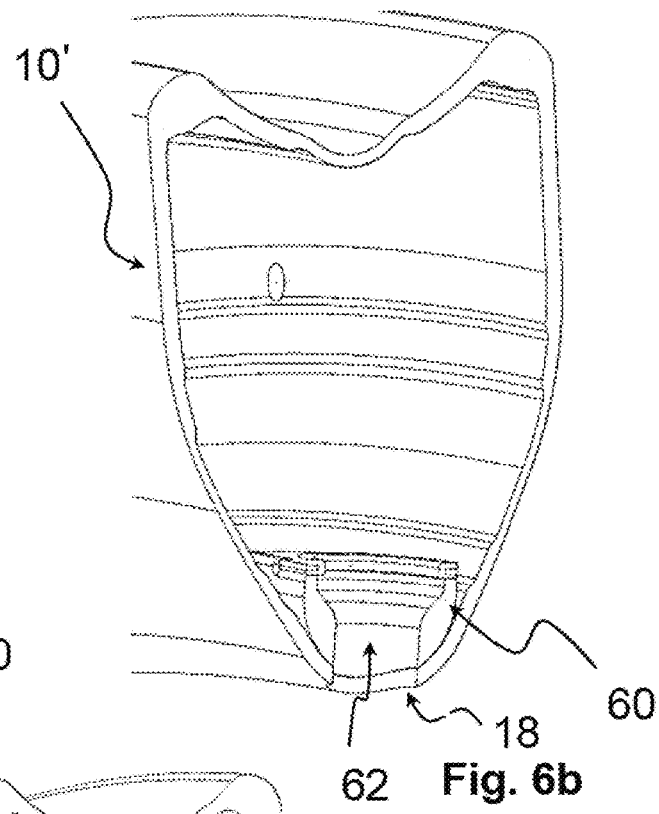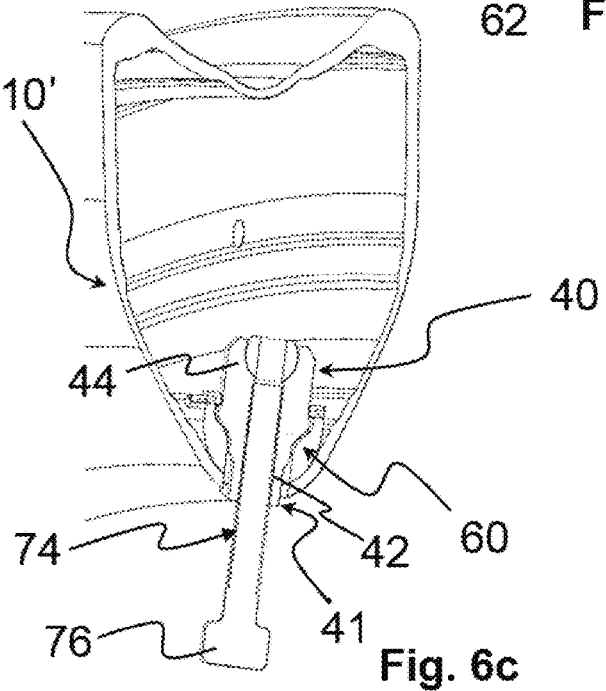

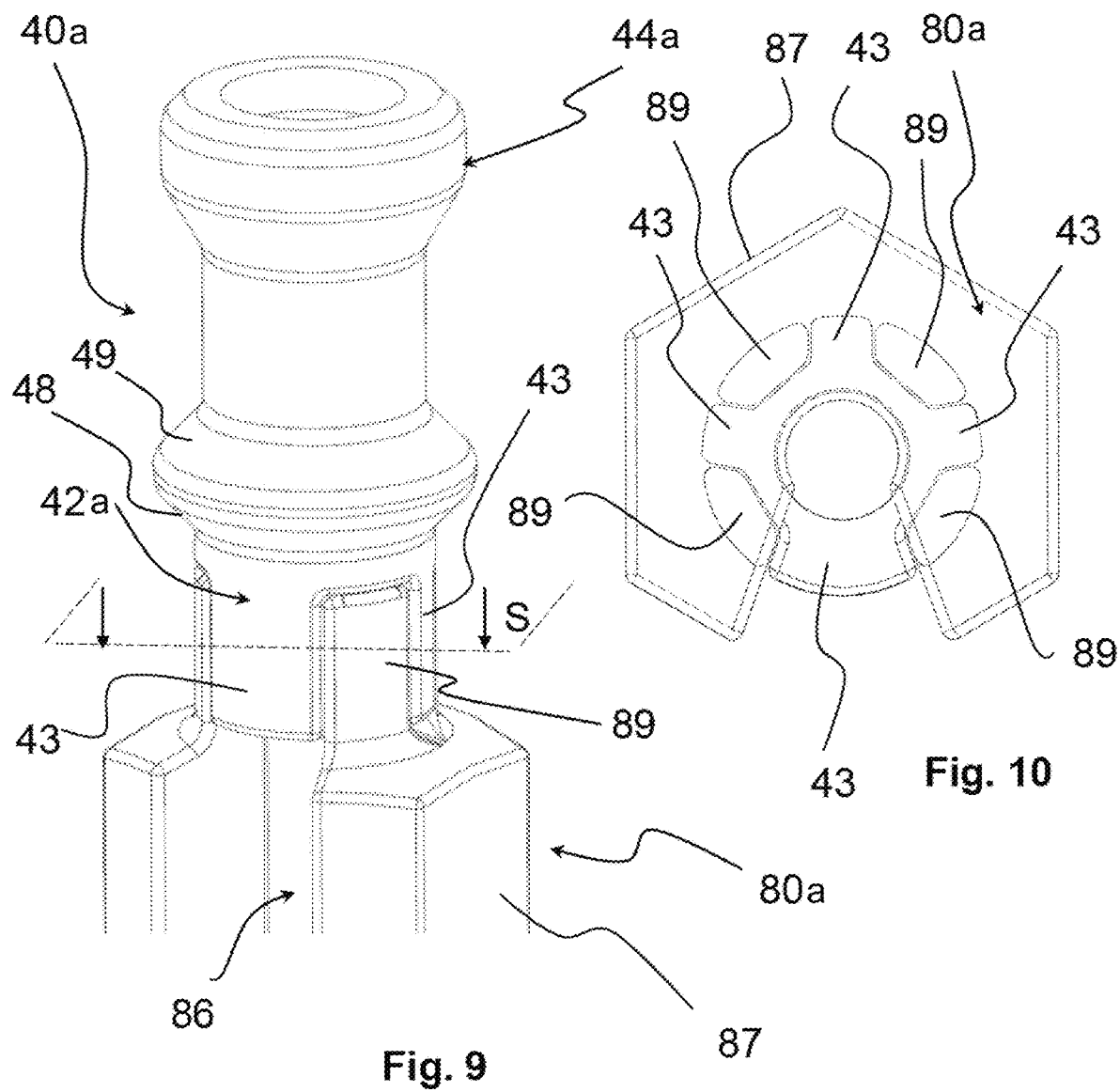

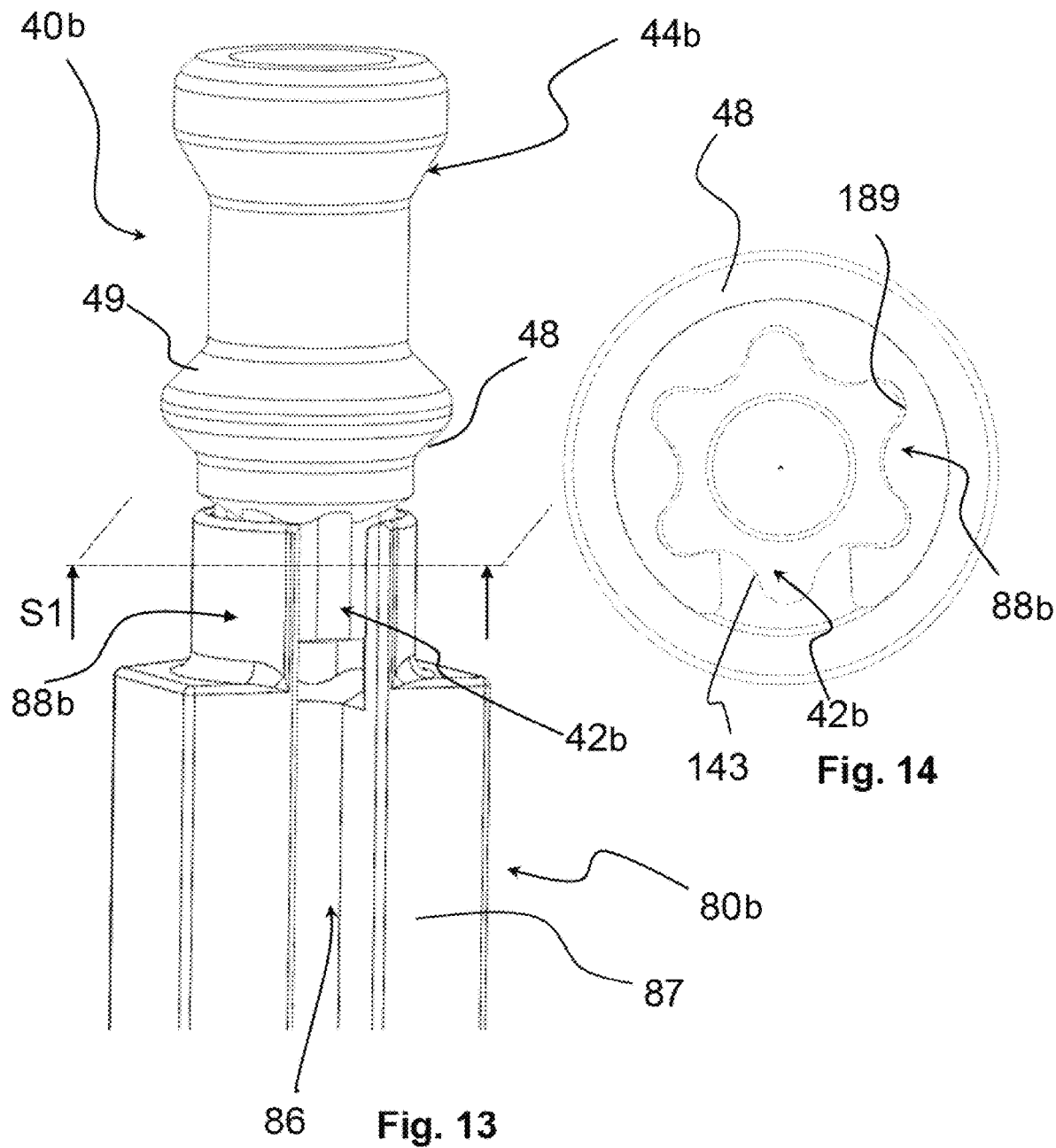

INSERT FOR A RIM OF A SPOKED WHEEL FOR BICYCLE AND RESPECTIVE SPOKED WHEEL FOR BICYCLE

CROSS REFERENCE TO RELATED APPLICATION(S)

This application claims the benefit of Italian Patent Application No. 102017000140052, filed on Dec. 5, 2017, which is incorporated herein by reference as if fully set forth.

FIELD OF INVENTION

The invention relates to an insert for a rim of a spoked wheel for bicycle. More particularly, the invention relates to an insert that stabilizes the spoke in the rim. The invention also relates to a spoked wheel for a bicycle comprising such an insert. The wheel can be a front wheel or a rear wheel on a mountain-bike or a roadster bicycle or a racing bicycle.

BACKGROUND

A spoked wheel for a bicycle comprises a rim, a hub and a plurality of spokes extending between the hub and the rim, the tension of which must preferably be able to be adjusted at the hub and/or the rim.

In order to allow the adjustment of the tension, a first threading is typically provided at a first end portion of the spokes and a threaded hole is arranged at the hub or the rim. The threaded hole is made directly in the hub or rim, or in a spoke attachment element associated with the hub or rim. The second end portion of the spokes can be provided with a second threading or with a head, for example rectangular or circular, housed in a suitable seat, for example hooked in a flange of the hub or inserted in a bayonet coupling at the rim, as for example described in US 2007/0158996, which is discussed below.

Rims are known having a radially outer tyre coupling channel and a radially inner spoke attachment chamber. More in particular, such rims comprise two side walls connected or joined at one end by a radially inner wall or lower bridge, and in an intermediate point by a radially outer wall or upper bridge or partition, so as to have a substantially inverted A-shaped cross-section. The radially outer portions of the side walls are typically provided with an edge configured to couple with a bead of the tyre and form the tyre coupling channel with the upper bridge or partition, whereas the radially inner portions of the side walls form, with the lower bridge and the upper bridge, a spoke attachment chamber. Such a type of rim is illustrated in US 2007/0158996.

A plurality of spoke attachment holes is made on the lower bridge of the rim. Generally, the spoke attachment holes receive the spoke attachment element provided with a longitudinal cavity having a threading or with a longitudinal cavity having a shaped seat. The longitudinal length of the threading of the longitudinal cavity of the spoke attachment element can be equal to the longitudinal length of the threading of the spoke, or longer to also allow the adjustment of the tension of the spoke by changing the screwing depth of the spoke in the threaded longitudinal cavity of the spoke attachment element.

The spoke attachment elements are also called "nipples", if they allow the adjustment of the tension of the spoke, or "barrels" if they do not allow it.

Instead of a single spoke attachment chamber, two or more chambers can be provided through one or more partition walls, extending substantially parallel to the upper bridge or substantially transversal to it. Each wall (upper bridge, lower bridge, side walls and partition walls), furthermore, can be shaped in various ways, making an even considerably complex cross section of the rim.

The rims can be made from aluminum (typically by extrusion of a section bar) or from composite material (typically by compression molding).

The Applicant has concentrated its attention on rims made from composite material.

EP 3225384 A1, to the same Applicant, discloses a process for manufacturing a rim at least partially made from composite material. The manufactured rim comprises a wall made from composite material and a plurality of perforated spoke attachment seats, the latter comprising a hole made in the wall and an amassment of structural fibers arranged in a surrounding area of the hole. The rim may further comprise an insert having a through hole, constrained to (preferably co-moulded with) the composite material at the perforated seat. The insert increases the resistance of the rim to the traction stresses by the spokes of the wheel. Moreover, the fact of constraining the insert to the composite material avoids frictional wear due to the sliding of the insert on the composite material.

US 2007/0158996 A1, to the same Applicant, discloses a rim in which the upper bridge comprises only the hole for the inflation valve of the tyre (and it is therefore also proper for the use with tubeless tyres). Such a document also discloses a process aimed at making a spoked wheel for bicycle. Such a process comprises the step of inserting the spoke attachment element in the spoke attachment chamber through an opening (which can be the aforementioned hole or a different opening suitably made) and guiding the spoke attachment element along the spoke attachment chamber towards and up to a respective spoke attachment hole. The spoke attachment element has a head adapted for being held inside the spoke attachment chamber at the spoke attachment hole and a stem that projects from the lower bridge in a radially inner direction thereof. The process comprises the step of inserting the stem of the spoke attachment element in the spoke attachment hole until the head is brought into abutment on the lower bridge of the rim and the stem is made to project from the lower bridge radially inside the rim (see for example FIG. 9 of such a document).

US 2007/080577 A1 discloses a nipple for a bicycle wheel comprising a head intended to abut on a radially inner wall of the rim and a stem comprising a threaded portion intended to be screwed to a matching threaded portion made at the end of the spoke.

The Applicant has observed that in the aforementioned prior art documents the stems of the spoke attachment elements are typically sized to project significantly from the rim in a radially inner direction thereof and the portion of stem projecting from the rim is typically shaped to allow the stem to be gripped by a suitable tool during the mounting and the adjustment of the tension of the spoke. The latter provision is necessary particularly in the cases in which the upper bridge of the rim is not perforated. In such cases, indeed, it is not possible, during the mounting and the adjustment of the tension of the spoke, to hold the spoke attachment element at its head and it is thus necessary to do so at the radially inner area with respect to the rim.

In some rims currently commercialized by the Applicant, the stem projects from the rim by about 7 mm.

The Applicant has noted that, close to the lower bridge of the rim, and more in particular at the areas in which the spokes are connected to the stems of the spoke attachment elements there are changes of diameter between the diameter of the stem and the diameter of the spoke. Such changes of diameter create turbulences during rolling.

The Applicant has observed that the lower bridge of the rim, and in particular the size of its radius of curvature, greatly influences the aerodynamic behavior of the wheel with respect to front or side wind. A wheel with a lower bridge having a small radius of curvature (for example equal to about 5.5 mm) has better performance with the front wind whereas a wheel with a lower bridge having a greater radius of curvature (for example equal to about 9.5 mm) behaves better in case of side wind.

U.S. Pat. No. 7,140,696 B1 discloses a wheel comprising a rim with nipples arranged entirely inside the spoke attachment chamber. In order to screw the spokes on the nipples, a plurality of holes is made on the upper bridge of the rim.

The Applicant has observed that the wheel of U.S. Pat. No. 7,140,696 B1 is not suitable for the use with tubeless type tyres.

According to the Applicant, the aforementioned turbulences, occurring precisely close to the lower bridge of the rim, significantly and unpredictably change the expected aerodynamic behavior.

Therefore, there is a need to improve the aerodynamics of the wheels at the lower bridge of the rim.

SUMMARY

The technical solution of the present invention is that of providing an insert that allows the mounting and the tensioning of the spokes in bicycle wheels that, the structural strength being equal, have better aerodynamic behavior than that of the wheels of the prior art and that can be used both with tyres provided with air chamber and with tubeless type tyres.

The insert of the present invention provides a rim insert with a first surface portion configured to abut against an inner surface of the spoke attachment hole of the rim and a second surface portion configured to abut against an enlarged head of the spoke attachment to prevent the movement of the spoke attachment when said spoke attachment element abuts against the second surface portion.

BRIEF DESCRIPTION OF THE DRAWINGS

The features and advantages of the invention will become clearer from the description of some preferred embodiments thereof, made with reference to the attached drawings, where:

FIG. 4 is an enlarged perspective view of an insert used in the rim of FIGS. 2 and 3;

FIG. 5 is a perspective view of a component of the insert of FIG. 4;

FIGS. 6a-6d are perspective view in an axial section of the wheel of FIG. 1, taken at a spoke attachment hole, in successive steps of making and mounting of the wheel;

FIG. 9 is a perspective view of the spoke attachment element of FIG. 7 with which a first embodiment of an adjustment tool for adjusting the tension of a spoke is coupled;

FIG. 10 is a cross section view of the spoke attachment element and of the tool shown in FIG. 9, the cross section being taken at the section plane S of FIG. 9;

FIG. 13 is a perspective view of the spoke attachment element of FIG. 11 with which a second embodiment of an adjustment tool for adjusting the tension of a spoke is coupled;

FIG. 14 is a cross section view of the spoke attachment element and of the tool shown in FIG. 13, the cross section being taken at the section plane 51 of FIG. 13;

DETAILED DESCRIPTION OF THE PREFERRED EMBODIMENTS

Figure 1:
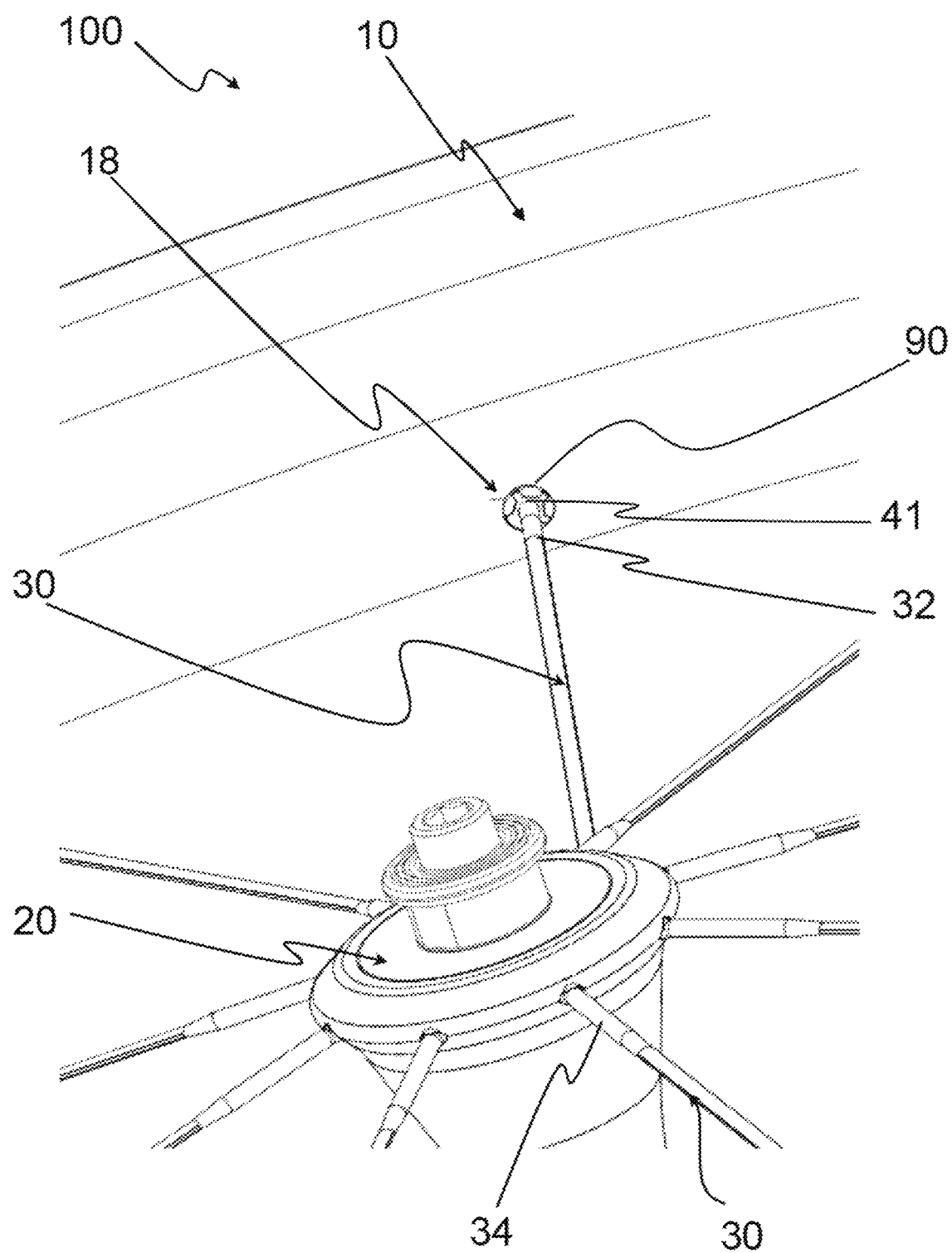
FIG. 1 is a perspective view of a portion of spoked wheel for bicycle according to the present invention.

In the present description and in the following claims, the terms "axial", "axially" and similar terms refer to a direction substantially coinciding with or substantially parallel to the rotation axis of the wheel, the terms "radial", "radially" and similar terms refer to a direction perpendicular to the rotation axis of the wheel and incident on the rotation axis of the wheel, and the terms "circumferential", "circumferentially" and similar terms refer to a circumferential direction around the rotation axis of the wheel.

In the rest of the present description and in the following claims, the term "composite material" is used to indicate a material comprising structural fibers incorporated in a polymeric material. The structural fibers are preferably selected from the group comprising carbon fibers, glass fibers, boron fibers, aramid fibers, ceramic fibers and combinations thereof. The polymeric material can be thermoplastic or thermosetting.

The terms "axially inner" and "axially outer" and similar terms refer to positions respectively closer to, and farther from, a median transversal plane of the wheel, whereas the terms "radially inner" and "radially outer" and similar terms refer to positions respectively closer to, and farther from, the rotation axis of the wheel.

The present invention relates, in a first aspect thereof, to an insert for a rim of a spoked wheel for bicycle, comprising:

a first surface portion configured to abut against an inner surface of a rim at a spoke attachment hole of the rim, a through hole extending along a longitudinal axis and configured to be crossed by a spoke attachment element, and a second surface portion configured to abut against an enlarged head of the spoke attachment element, characterized in that it comprises at least one holding element configured to prevent the movement of the spoke attachment element along said longitudinal axis when said spoke attachment element abuts against said second surface portion.

Advantageously, the provision of an insert having the aforementioned holding element prevents the spoke attachment element from moving along a radially outer direction during the operations of attachment and tensioning of the spoke. Therefore, it is not necessary to make holes in the upper bridge at every spoke attachment hole in order to hold the spoke attachment element in position during the aforementioned operations, as conversely occurs in the wheel according to U.S. Pat. No. 7,140,696 B1.

The insert of the invention can therefore be used in wheels intended to receive both tyres provided with air chamber and tubeless type tyres.

Moreover, thanks to the provision of the aforementioned holding element during the mounting and the adjustment of the tensioning of the spoke, it is not necessary for the operator to grip the spoke attachment element by a tool. It is therefore possible to use a spoke attachment element which does not project radially from the rim internally with respect to the rim, or which has a radially inner end portion which projects radially from the rim internally with respect to the rim by a segment having a reduced length, in particular shorter than or equal to the diameter of the spoke at the spoke attachment hole. The worsening in terms of aerodynamic behavior of the wheel due to the spoke attachment element is therefore null or substantially null. Indeed, even in the case in which the aforementioned segment protrudes internally with respect to the rim, it has a negligible length with respect to the dimensions of the spoke. In practice, such a segment does not generate additional turbulences with respect to those generated by the spoke.

Advantageously, the insert also acts as a local reinforcement and as a support for the spoke attachment element and allows a better distribution of the stresses on the rim caused by the tensioning of the spoke.

The insert of the invention can comprise, singularly or in combination, one or more of the following preferred features.

In a preferred embodiment of the invention, the insert comprises a main body on which a first through hole is made and an annular element coupled with the main body and having a second through hole arranged coaxially to the first through hole, the through hole of the insert being defined by the first and second through hole.

Preferably, said at least one holding element is defined by at least one flexible portion of said annular element that projects cantilevered in said second through hole.

Preferably, said flexible portion of said annular element is coated with rubber.

Preferably, said annular element is made from metallic material.

Preferably, said annular element is substantially flat and is co-molded on said main body.

Alternatively, said annular element is substantially flat and is locked on said main body through at least one covering layer comprising carbon fibers.

Preferably, at least one insulating layer comprising glass fibers is interposed between said main body and said annular element in order to prevent that galvanic corrosion phenomena arises between the metallic material of the aforementioned annular element and the composite material of the rim.

In a variant of the insert of the invention, said at least one holding element is defined by an O-ring arranged in a circumferential seat formed in a position adjacent to an undercut annular surface of said insert.

Preferably, said circumferential seat is defined at a first portion of said insert comprising said first surface portion or at a second portion of said insert comprising said second surface portion. In both cases, the circumferential seat comprises an undercut radially outer annular surface configured to prevent the movement of the O-ring in a radially outer direction and, possibly, an undercut radially inner annular surface configured to prevent the movement of the O-ring in a radially inner direction.

In accordance with an alternative embodiment of the invention, the insert comprises a pair of hooking arms that extend parallel to said longitudinal axis and each comprising a folded free end portion defining a respective holding element.

In this case the coupling between the annular element and the aforementioned main body is of the "snap" type.

In accordance with a further alternative embodiment of the invention, said annular element comprises a pair of hooking arms each having a free end portion configured to couple with said main body. Also in this case the spoke attachment element is locked on the insert with a hooking of the "snap" type.

In accordance with a further embodiment of the invention, the insert comprises a main body on which a first through hole is made and an auxiliary body coupled with said main body and having a second through hole arranged coaxially to said first through hole.

Preferably, the through hole of the insert is defined by the first and second through hole.

More preferably, said at least one holding element is defined by an O-ring arranged in a circumferential seat formed in said auxiliary body in a position adjacent to an undercut annular surface of said auxiliary body.

In a second aspect, the invention relates to a spoked wheel for bicycle, comprising:

a rim made at least partially from composite material and provided with a plurality of spoke attachment holes, a plurality of spokes coupled with the rim at said spoke attachment holes, a spoke attachment element arranged at a respective spoke attachment hole, at least one insert in abutment against an inner surface of said rim, wherein said at least one insert is an insert according to the first aspect of the present invention.

Such a wheel can advantageously comprise rims with the upper bridge provided or not provided with holes further than the hole for the inflation valve and can therefore be used both with tyres provided with air chamber and with tubeless type tyres.

Preferably, said spoke attachment element is partially inserted in said spoke attachment hole and does not project radially from the rim internally with respect to the rim.

Alternatively, said spoke attachment element is partially inserted in said spoke attachment hole and comprises a radially inner end portion that projects radially from the rim internally with respect to the rim by a segment having a length shorter than or equal to the diameter of the spoke at said spoke attachment hole.

A benefit of the invention is obtained in the aerodynamic behavior of the wheel.

With reference now to FIGS. 1-5, reference numeral 100 wholly indicates a first embodiment of a spoked wheel for bicycle according to the present invention.

The wheel 100 comprises a rim 10, a hub 20 and a plurality of spokes 30 extending between the hub 20 and the rim 10. The tension of the spokes 30 is adjusted at the rim 10 through spoke attachment elements 40 (FIGS. 2 and 3).

The rim 10 is made at least partially from composite material. Preferably, the rim 10 is made entirely from composite material.

Figure 2:
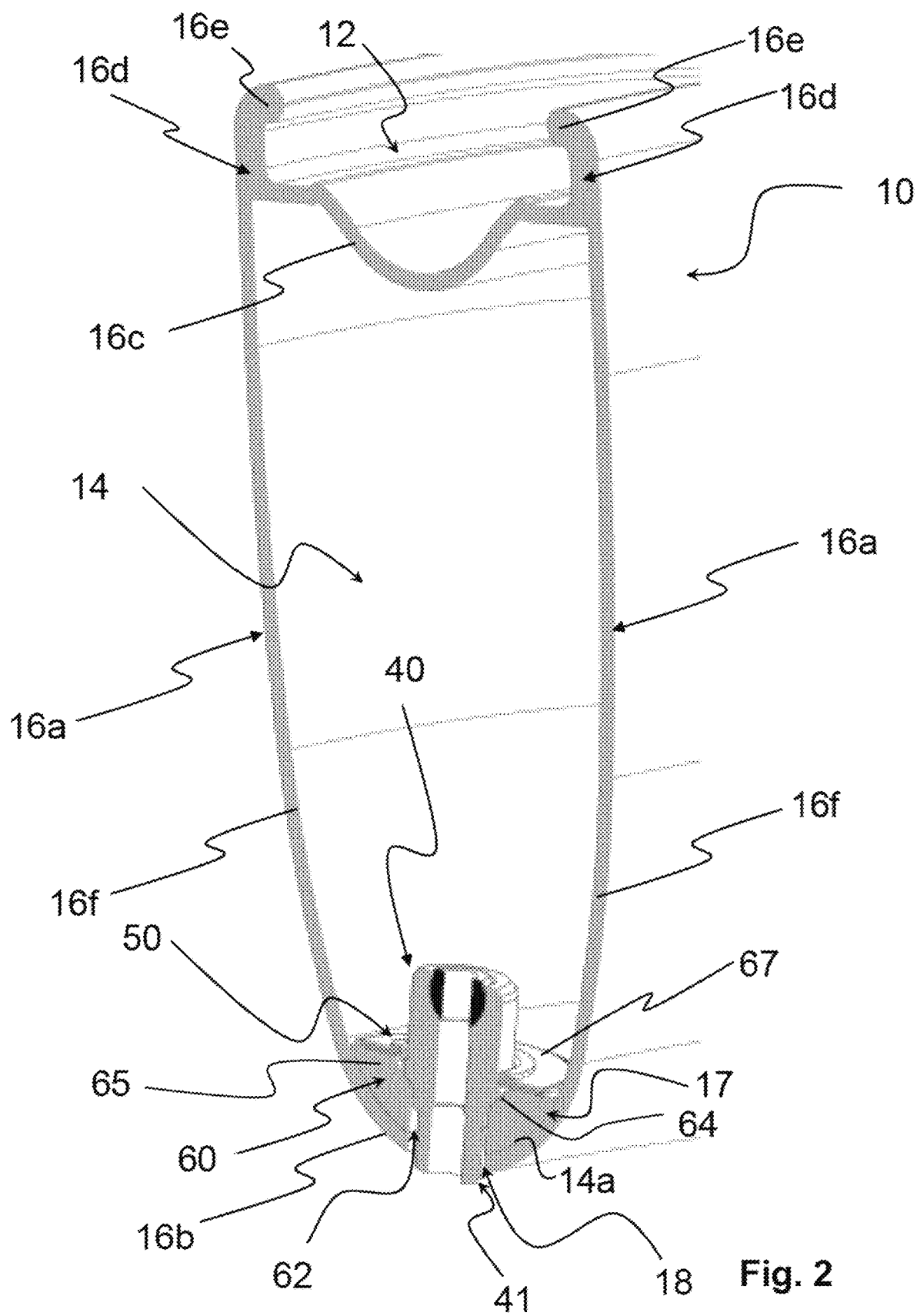
FIG. 2 is a perspective view, enlarged and in an axial section, of the rim of the wheel of FIG. 1, taken at a spoke attachment hole.
Figure 3:
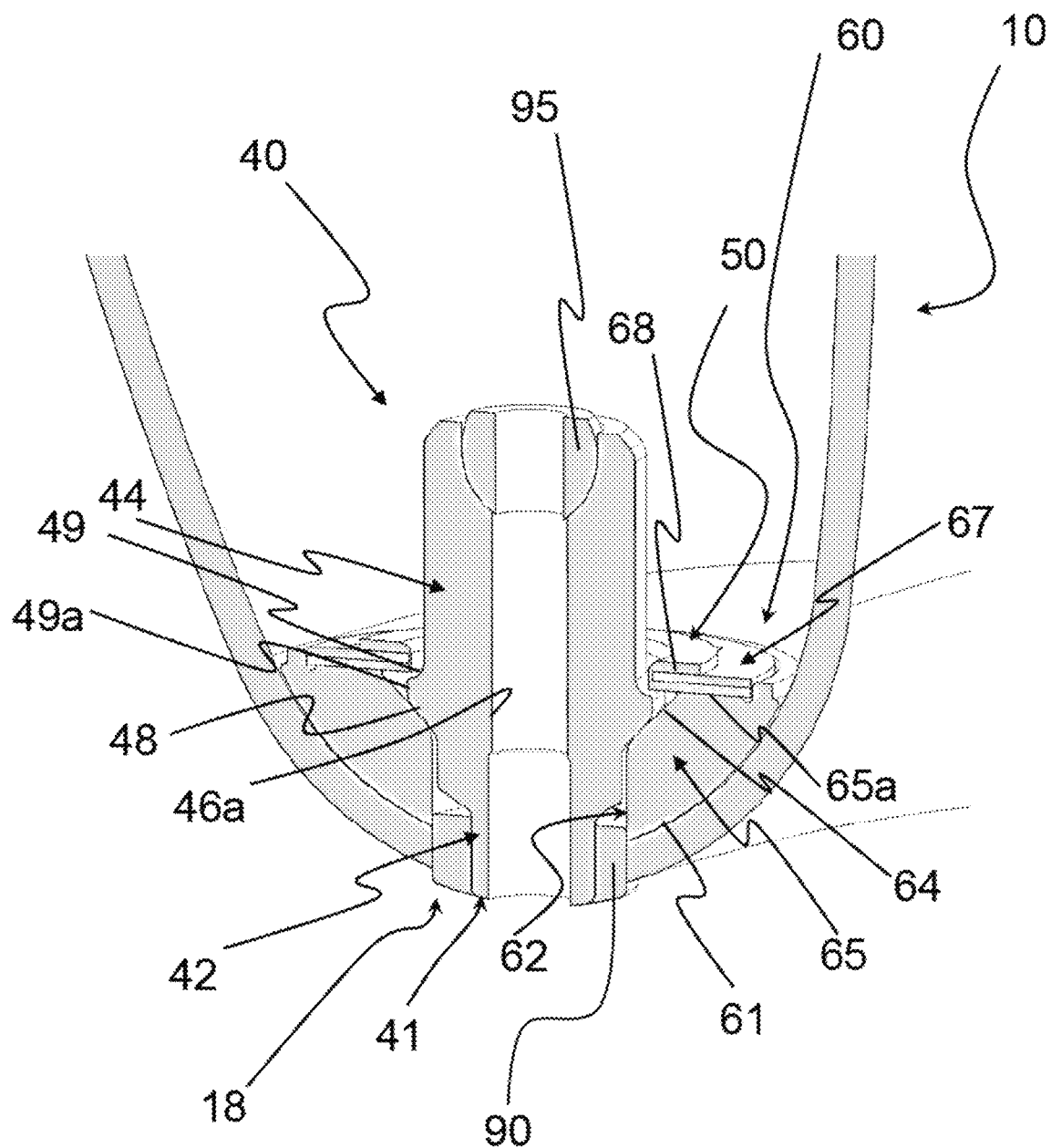
FIG. 3 is an enlarged perspective view of a radially lower portion of the rim of FIG. 2.

With reference to FIG. 2, the rim 10 comprises a radially outer tyre coupling channel 12 and a radially inner spoke attachment chamber 14.

The rim 10 is preferably used with a tubeless type tyre (not illustrated).

The rim 10 is formed by two side walls 16a connected or joined at a radially inner end by an inner circumferential wall or lower bridge 16b. The two side walls 16a are further connected in an intermediate point by an outer circumferential wall or upper bridge (or partition) 16c, so as to have a substantially inverted A-shaped cross section (FIG. 2).

The side walls 16a comprise respective radially outer portions or fins 16d typically provided with a folded end 16e. The fins 16d form, with the upper bridge 16c, the tyre coupling channel 12. More in particular, the tyre, not illustrated for reasons of clarity, is mounted in the tyre coupling channel 12 by inserting the beads thereof in the fins 16d, the folded ends 16e acting to hold the beads in a per se known way.

The radially inner portions 16f of the side walls 16a form, with the lower bridge 16b and the upper bridge 16c, the spoke attachment chamber 14.

The rim 10 comprises a pair of holes (not illustrated) for housing an inflation valve of the tyre (not shown). Such holes are made substantially coaxially in the upper bridge 16c and in the lower bridge 16b.

The fins 16d are subject to geometric and dimensional constraints both due to the need to hook the tyre, and due to the need to externally provide a suitable sliding surface of the brake pads. The upper bridge 16c is subject to the constraint, in the case of tubeless type tyre, of making an airtight seal with the tyre and therefore of having only the hole for the valve. For tyres with air chamber, of course, such a constraint does not exist and therefore further holes can be provided in addition to the one for the valve.

On the other hand, the portions 16f of the walls 16a and the lower bridge 16b are not subject to particular geometric or dimensional constraints and can therefore be replaced by a single wall having a cross-section shaped like an arc of circle or by a plurality of walls so as to form a section of more complex shape than the one illustrated, possibly defining a plurality of spoke attachment chambers 14 (not illustrated).

The particular section illustrated in FIGS. 2 and 3 therefore has a merely illustrative and non-limiting purpose of the present invention.

The spoke attachment chamber 14 is provided with a plurality of spoke attachment seats 17 (FIG. 2), each of which comprising a spoke attachment hole 18 (FIG. 1).

The spoke attachment hole 18 is a non-threaded hole.

The spoke attachment seats 17 are illustrated as formed in the lower bridge 16b of the spoke attachment chamber 14, but they can also be formed in one or both of the portions 16f of the side walls 16a.

The spoke attachment seats 17 can be uniformly distributed along the median plane of the rim 10. The number and the distribution of the spoke attachment seats 17 can vary greatly. For example, the seats 17 could be gathered in groups of two or three or four and/or be made on a plurality of planes, different from the median plane of the rim 10.

The spokes 30 are coupled with the rim 10 at the spoke attachment holes 18 using spoke attachment elements 40, each arranged at a respective spoke attachment hole 18.

The spoke attachment element 40 comprises a stem 42 configured to extend through the spoke attachment hole 18 and an enlarged head 44 having a size greater than that of the stem 42 and configured to be held inside the spoke attachment chamber 14.

Preferably, each spoke attachment hole 18 has a substantially circular section, but it could have a different shape, provided that it is configured to house the stem 42 of the spoke attachment element 40.

A first end portion 32 of a spoke 30 is attached to the spoke attachment element 40, the second end portion of the spoke 34 being attached to the hub 20 (FIG. 1).

The spoke attachment element 40 may or may not allow the adjustment of the tension of the spoke 30.

The spoke attachment elements 40 are preferably nipples (i.e. they allow the adjustment of the tension of the spokes 30), but they could also be barrels (i.e. they do not allow the adjustment of the tension of the spokes 30).

The following description refers to the case in which the spoke attachment elements 40 are nipples.

The spoke attachment elements 40 comprise a threaded through hole 46a having a length such as to allow the screwing to different depths of the first end portion 32 of the spoke 30, which has a threading matching that of the threaded through hole 46a to obtain the adjustment of the tension of the spoke 30.

The spoke attachment element 40 is partially inserted in the spoke attachment hole 18 and comprises a radially inner end portion 41 that, in the specific example illustrated herein, projects radially from the rim 10 internally with respect to the rim 10 by a segment having a length shorter than or equal to the diameter of the spoke 30, measured at the spoke attachment hole 18. More in particular, the aforementioned length is shorter than or equal to the diameter of the first end 32 of the spoke 30.

In preferred embodiments of the present invention, such a length is shorter than or equal to about 2 mm.

The wheel 100 comprises a holding element 50 configured to prevent the movement of the spoke attachment element 40 along a radially outer direction.

In a first embodiment of the wheel 100 illustrated in FIGS. 1-5 the holding element 50 is defined in an insert 60 arranged inside the spoke attachment chamber 14. The insert 60 is illustrated in FIG. 4.

As illustrated in FIG. 2, the insert 60 comprises a first surface portion 61 arranged inside the spoke attachment chamber 14 at the spoke attachment hole 18 and in abutment against an inner surface 14a of the spoke attachment chamber 14. With reference to the mounting position of the insert 60, the first surface portion 61 is therefore a radially inner surface of the insert 60.

The insert 60 comprises a through hole 62 extending along a longitudinal axis X, arranged coaxially to the spoke attachment hole 18 and crossed by the spoke attachment element 40 (FIGS. 2 and 3).

As illustrated in FIG. 3, the insert 60 also comprises a second surface portion 64, which acts as an abutment for the enlarged head 44 of the spoke attachment element 40, in particular for a radially inner abutment surface 48 of the enlarged head 44. The abutment surface 48 has a shape matching that of the second surface portion 64. In the example of FIGS. 2 and 3, the abutment surface 48 and the second surface portion 64 are frusto-conical in shape.

As illustrated in FIGS. 1 and 3, a sealing element 90, for example a rubber element, is coupled with the rim 10 at the spoke attachment hole 18. The sealing element 90 comprises a through hole in which the radially inner end portion 41 of the spoke attachment element 40 is inserted. The sealing element 90 has a shape matching that of the radially inner end portion 41 of the spoke attachment element 40.

With reference to the mounting position of the insert 60, the second surface portion 64 is therefore a radially outer surface of the insert 60.

The through hole 62 is preferably defined centrally in the first surface portion 61 and in the second surface portion 64 of the insert 60.

The holding element 50 prevents the movement of the spoke attachment element 40 along the longitudinal axis X when the spoke attachment element 40 is in abutment against the second surface portion 64.

The insert 60 comprises a main body 65, on which the aforementioned first surface portion 61 and second surface portion 64 are made, and an annular element 67 coupled with the main body 65 and, in particular, substantially overlapping the main body 65.

The through hole 62 is defined by a first through hole 62*a* formed in the main body 65 and by a second through hole 62*b* formed in the annular element 67 coaxially to the first through hole 62*a*.

The annular element 67 preferably consists of a substantially flat metallic plate.

The holding element 50 is defined by a flexible portion 67*a* of the annular element 67 that projects cantilevered in the through hole 62.

As illustrated in FIG. 5, the flexible portion 67*a* faces towards the second through hole 62*b* and is made flexible thanks to voids 67*b* of material that define tongues 67*c* facing towards the second through hole 62*b*.

The flexible portion 67*a* has a coating 68 made from flexible material, for example rubber. The function of the rubber is both for holding the moulding resin, which must not pass between the annular element 67 and the main body 65 during the moulding, and for generating friction with the spoke attachment element 40 once mounted.

The annular element 67 can be co-moulded on a radially outer portion 65*a* of the main body 65 or, alternatively, it can be locked on the radially outer portion 65*a* of the main body 65 through at least one covering layer arranged above the annular element 67 and comprising carbon fibers.

Preferably, at least one insulating layer comprising glass fibers is interposed between the main body 65 and the annular element 67.

The spoke attachment element 40 comprises a holding surface 49 configured to operate in abutment against the holding element 50.

In FIG. 3 the holding surface 49 is defined at a radially outer end portion of a circumferential projection 49*a* of the enlarged head 44 of the spoke attachment element 40.

The circumferential projection 49*a* is arranged in a radially outer position with respect to the abutment surface 48.

The circumferential projection 49*a* has a diameter greater than that of the second through hole 62*b* of the annular element 67.

In the mounting operation, the spoke attachment element 40 is inserted in the through hole 62 of the insert 60 until the abutment surface 48 abuts against the surface portion 64 of the insert 60. During insertion, the circumferential projection 49*a* of the enlarged head 44 folds the flexible portion 67*a* until it goes past it. The flexible portion 67*a* then takes again its undeformed configuration and holds the spoke attachment element 40 thanks to the abutment between holding surface 49 and flexible portion 67*a* (FIG. 3).

With reference to FIGS. 6*a*-6*d*, subsequent assembly steps of the wheel 100 of FIGS. 1-5 are shown.

The wheel 100 made from composite material is typically built by arranging layers of carbon fibers impregnated of resin inside a mould.

The inserts 60 are positioned at the spoke attachment holes 18. Such inserts 60 are coated with at least one perforated layer of carbon fiber in order to be held stationary inside the rim 10'.

The inserts 60 are made from a material that has features of resistance to fatigue and co-mouldability with the composite material. Suitable materials are thermoplastic or thermosetting polymers, possibly reinforced with fiber. However, it is also possible to use metallic materials. A particularly preferred material is the polyetherimide, commercialized with the name Ultem 2400 by Sabic, Riyadh.

During the moulding of the rim 10', in order to avoid the resins plugging the spoke attachment holes 18 and the through holes 62 of the inserts 60 and infiltrating in undesired areas, an auxiliary element 70 is used that has the function of a plug (FIG. 6*a*). The way of using the auxiliary element 70 is analogous to that described in EP 3225384 A1, to the same Applicant.

The auxiliary element 70 is made from a material that has features of deformability, resistance to the moulding temperatures and pressures of the composite material and of anti-adherence to the composite material. A particularly preferred material is latex or soft silicone rubber, for example a silicone having a Shore A hardness 50.

At the end of moulding the auxiliary element 70 is pulled out from its elongated portion 72 that faces towards the center of the rim 10', and it is thus extracted from the rim 10' (FIG. 6*b*).

Subsequently, through the hole for the inflation valve (or from an auxiliary hole) the spoke attachment elements 40 are inserted in the rim 10'.

The spoke attachment element 40 has a screw 74 made from metal (typically steel). The screw 74 is screwed in the threaded through hole 46*a*, with the head 76 of the screw 74 projecting from the stem 42 on the opposite side with respect to the enlarged head 44 of the spoke attachment element 40.

The spoke attachment element 40 with the screw 74 screwed thereto is inserted in the spoke attachment chamber 14 through the hole for the inflation valve (or through an auxiliary hole) and is taken with a magnet (as described in US 2007/0158996) at the through hole 62 of the respective insert 60, until the head 76 of the screw 74 inserts into the through hole 62 and comes out from the rim 10.

At this point the operator pulls the screw 74 radially inwards, until the spoke attachment element 40 is held in the insert 60 (FIG. 6*c*) by means of the abutment between abutment surface 48 of the enlarged head 44 of the spoke attachment element 40 and surface portion 64 of the insert 60 and of the abutment between holding surface 49 defined in the enlarged head 44 of the spoke attachment element 40 and holding element 50 defined in the insert 60.

The screw 74 is then unscrewed from the spoke attachment element 40 and it is possible to continue the mounting of the spoke 30 in the spoke attachment element 40, without it being necessary for the operator to hold the spoke attachment element 40 either while the screw 74 is being unscrewed, or while the spoke 30 is being screwed.

In the case the spoke 30 breaks close to the first end 32, the spoke attachment element 40 remains in the through hole 62 of the insert 60. For its replacement it is sufficient to strike it with a punch and make it come out from the hole for the inflation valve.

Figure 6D:
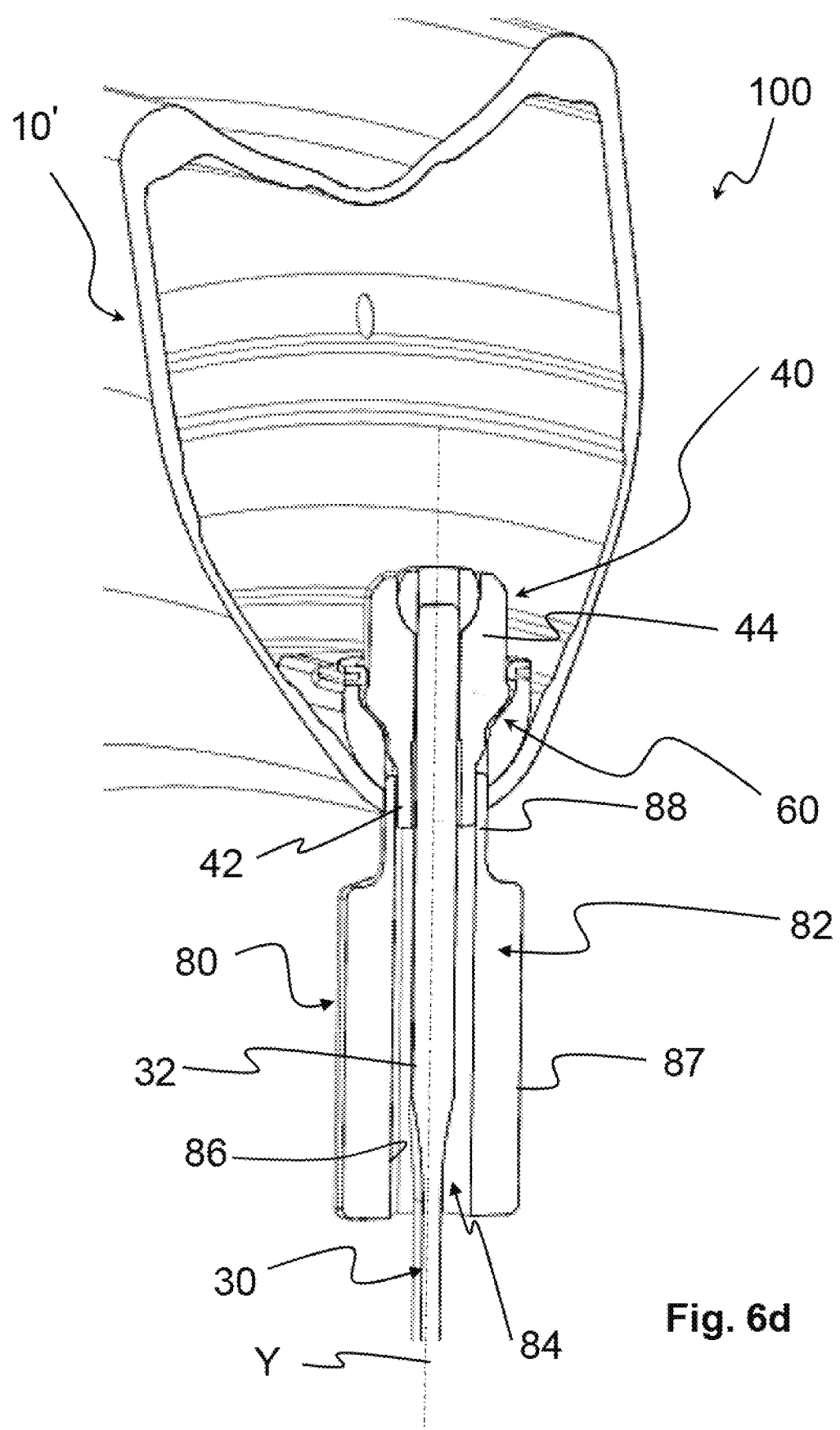
Figure 7:
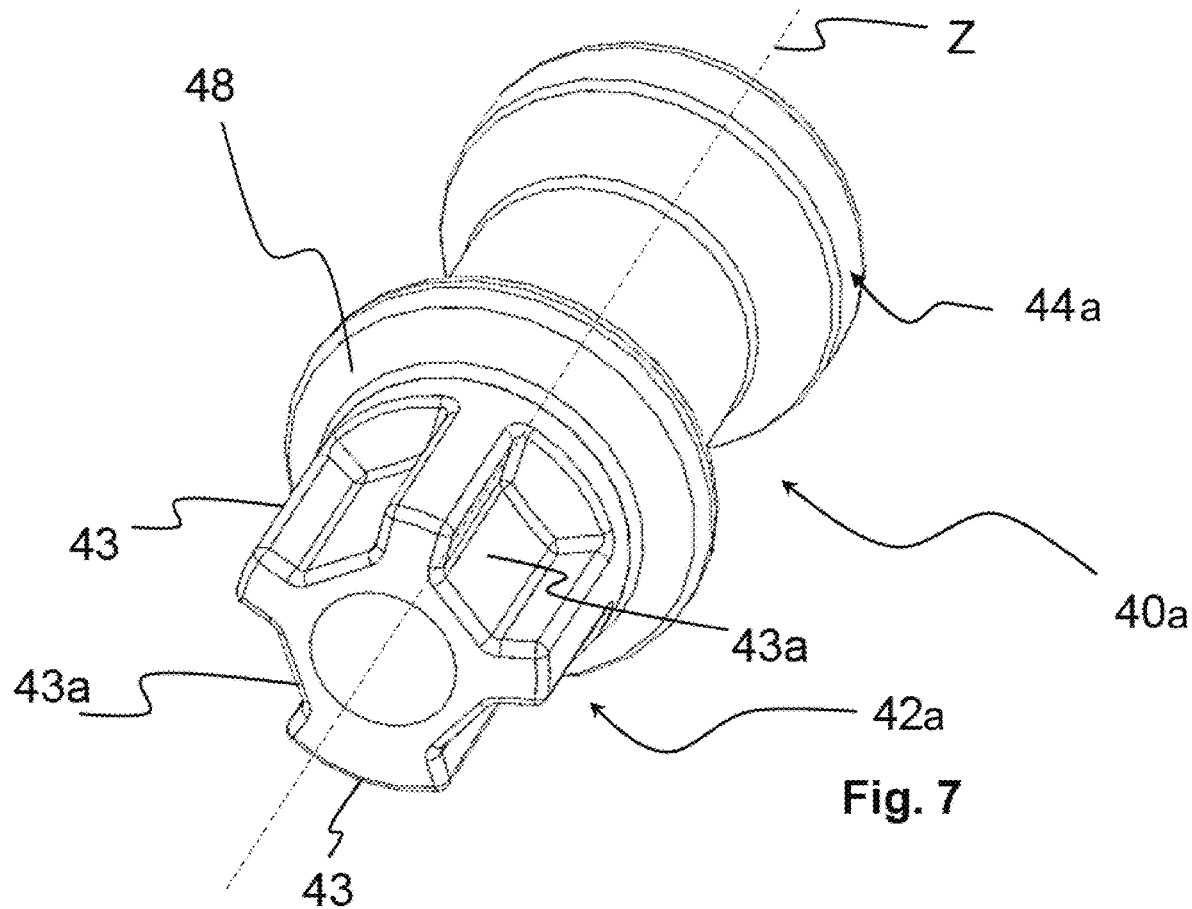
FIG. 7 is a perspective view of a first embodiment of a spoke attachment element used in the wheel according to the present invention.
Figure 8:
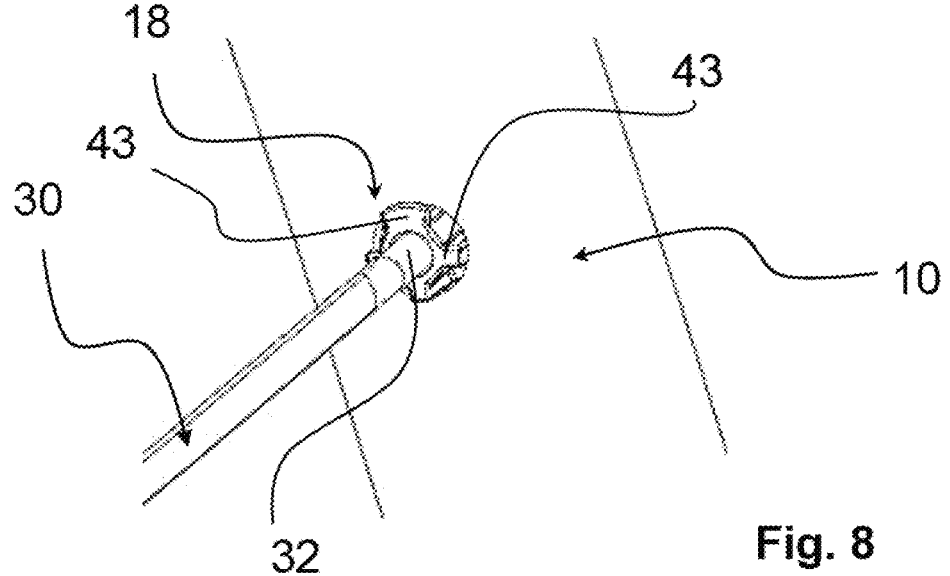
FIG. 8 is a perspective view of the spoke attachment element of FIG. 7 mounted on the wheel.
Figure 11:
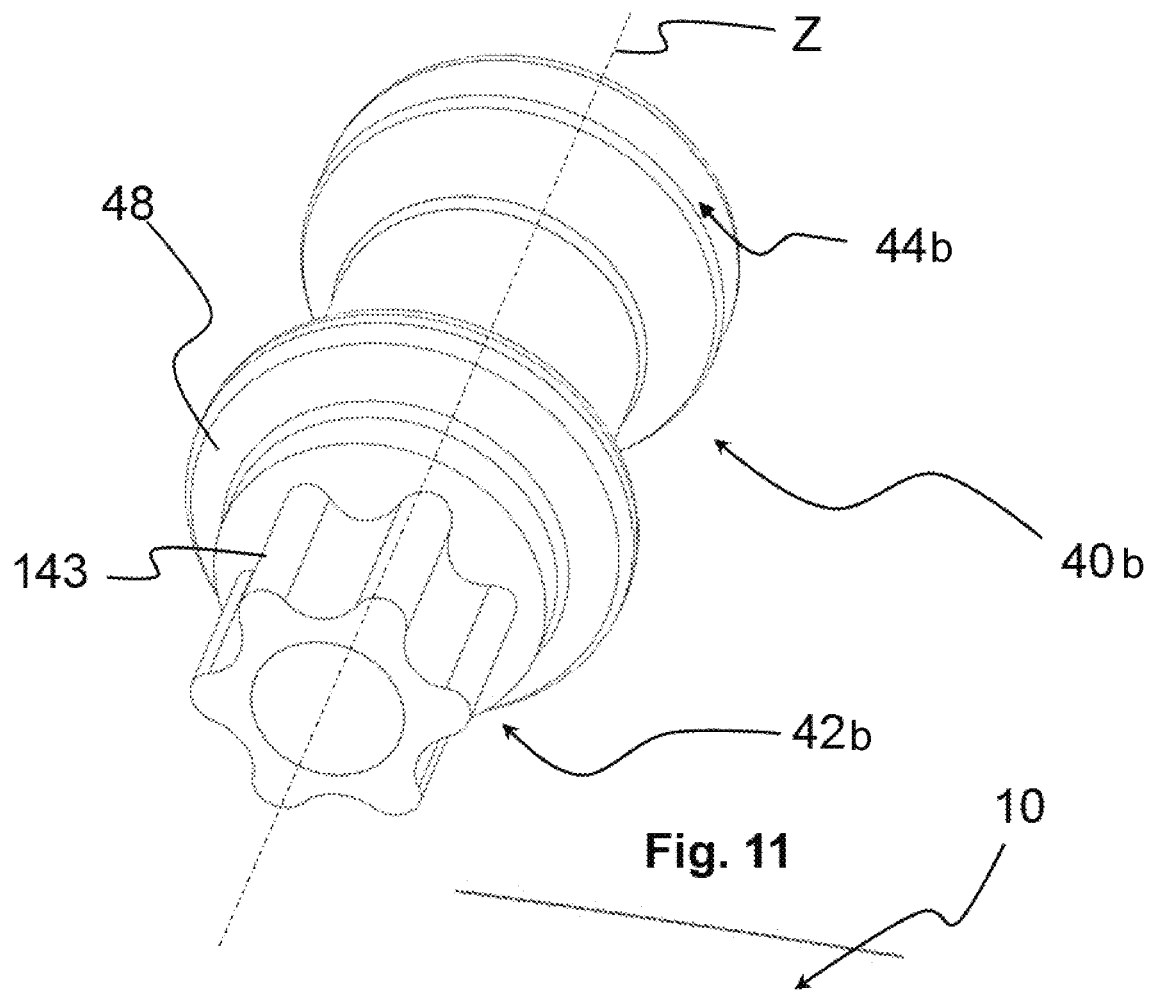
FIG. 11 is a perspective view of a second embodiment of a spoke attachment element used in the wheel according to the present invention.
Figure 12:
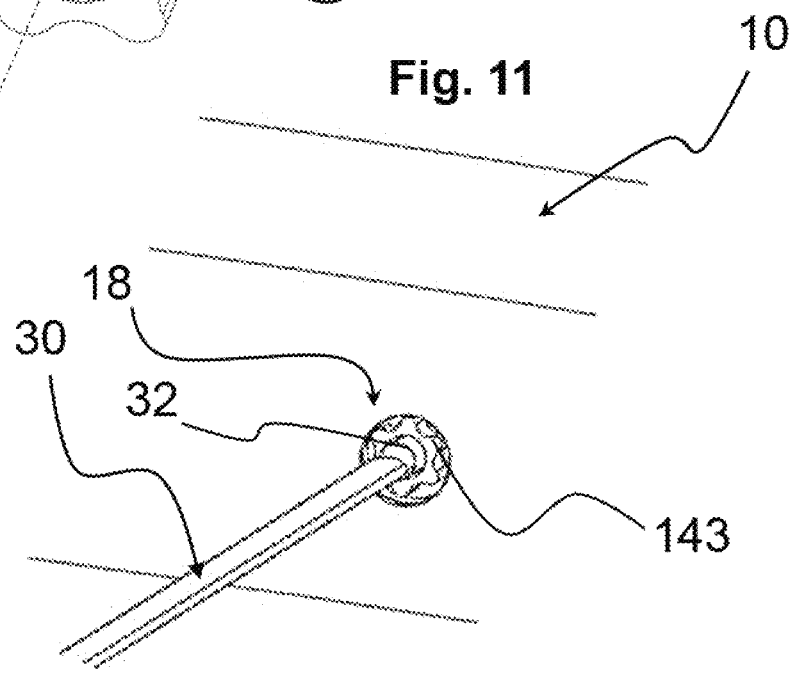
FIG. 12 is a perspective view of the spoke attachment element of FIG. 11 mounted on the wheel.

For the adjustment of the tension of the spoke 30 a suitable adjustment tool 80 is used, like for example the one illustrated in FIG. 6*d*.

The adjustment tool 80 comprises an elongated body 82, extending along a longitudinal axis Y and having a central longitudinal cavity 84 and a longitudinal through slit 86.

The central cavity 84 is configured to house the end portion 32 of the spoke 30. The slit 86 is configured to allow the housing of the end portion 32 of the spoke 30 in the central cavity 84.

The elongated body 82 comprises a grip portion 87 and a shaped end portion 88, extending along the longitudinal axis Y of the elongated body 82 and configured to couple with the stem 42 of the spoke attachment element 40.

The shaped end portion 88 has an outer bulk, defined on a plane perpendicular to the longitudinal axis Y of the elongated body 82, smaller than that of the grip portion 87 and smaller than the diameter of the spoke attachment hole 18 in which the stem 42 is inserted.

In this way, the shaped end portion 88 can insert inside the spoke attachment hole 18 and maneuver the stem 42 in rotation.

The shaped end portion 88 couples with the stem 42 of the spoke attachment element 40 through a surface having a shape matching that of the stem 42.

FIGS. 7-10, 11-14 and 15-17 respectively illustrate three variant embodiments of the spoke attachment element 40*a*, 40*b*, 40*c* and three respective variant embodiments of the adjustment tool 80*a*, 80*b*, 80*c*.

In FIGS. 7-17 the components and the portions of the spoke attachment element 40*a*, 40*b*, 40*c* analogous or functionally equivalent to those of the spoke attachment element 40 of FIGS. 2 and 3 are indicated with the same reference numeral and reference is made to the relative description made above.

The spoke attachment element 40*a* of FIGS. 7-10 has an enlarged head 44*a* and a stem 42*a*. The stem 42*a* comprises a plurality of longitudinal ribs 43, extending parallel to a longitudinal axis Z of the spoke attachment element 40*a*. In the non-limiting example illustrated herein, the ribs 43 are four, three of which have a substantially identical circumferential extension, whereas the fourth has a greater circumferential extension.

Housing seats 43*a* for respective maneuvering appendages 89 of the shaped end portion 88 of the adjustment tool 80*a* are identified between the ribs 43. The maneuvering appendages 89 project from the grip portion 87 parallel to the longitudinal axis Y of the elongated body 82 and have a shape matching that of the housing seats 43*a*.

In the illustrated non-limiting example, the housing seats 43*a* and the maneuvering appendages 89 are four, and they have substantially an identical circumferential extension (FIG. 10).

The maneuvering appendages 89 have for example a longitudinal extension comprised between about 2 mm and 4 mm.

The outer bulk of the maneuvering appendages 89 is substantially equal to that of the ribs 43 of the spoke attachment element 40*a*, which is substantially equal (slightly smaller) to that of the spoke attachment hole 18. In this way, the free space in the spoke attachment hole 18 is reduced when the spoke attachment element 40*a* is inserted therein. This reduces the problems caused by possible accumulation of dirt in this free space. On the other hand, the diameter of the adjustment tool 80*a* at the maneuvering appendages 89 is sufficiently large as to ensure an effective transfer of torque to the ribs 43 of the spoke attachment element 40*a* without risks of breaking or deforming the aforementioned maneuvering appendages 89.

The stem 42*b* of the spoke attachment element 40*b* of FIGS. 11-14, conversely, unlike that of the spoke attachment element 40*a* of FIGS. 7-10, comprises an outer toothing 143, extending parallel to a longitudinal axis Z of the spoke attachment element 40*b*. Preferably, the outer toothing 143 has a curved profile. In the non-limiting example illustrated herein the outer toothing 143 comprises six teeth and six valleys. The spoke attachment element 40*b* also includes an enlarged head 44*b*.

The shaped end portion 88*b* in this case comprises a toothed inner surface 189, extending parallel to the longitudinal axis Y of the elongated body 82. The toothed inner surface 189 has a shape matching that of the outer toothing 143 (FIG. 14).

The toothed inner surface 189 has for example a longitudinal extension comprised between about 2 mm and 4 mm.

Figure 15:
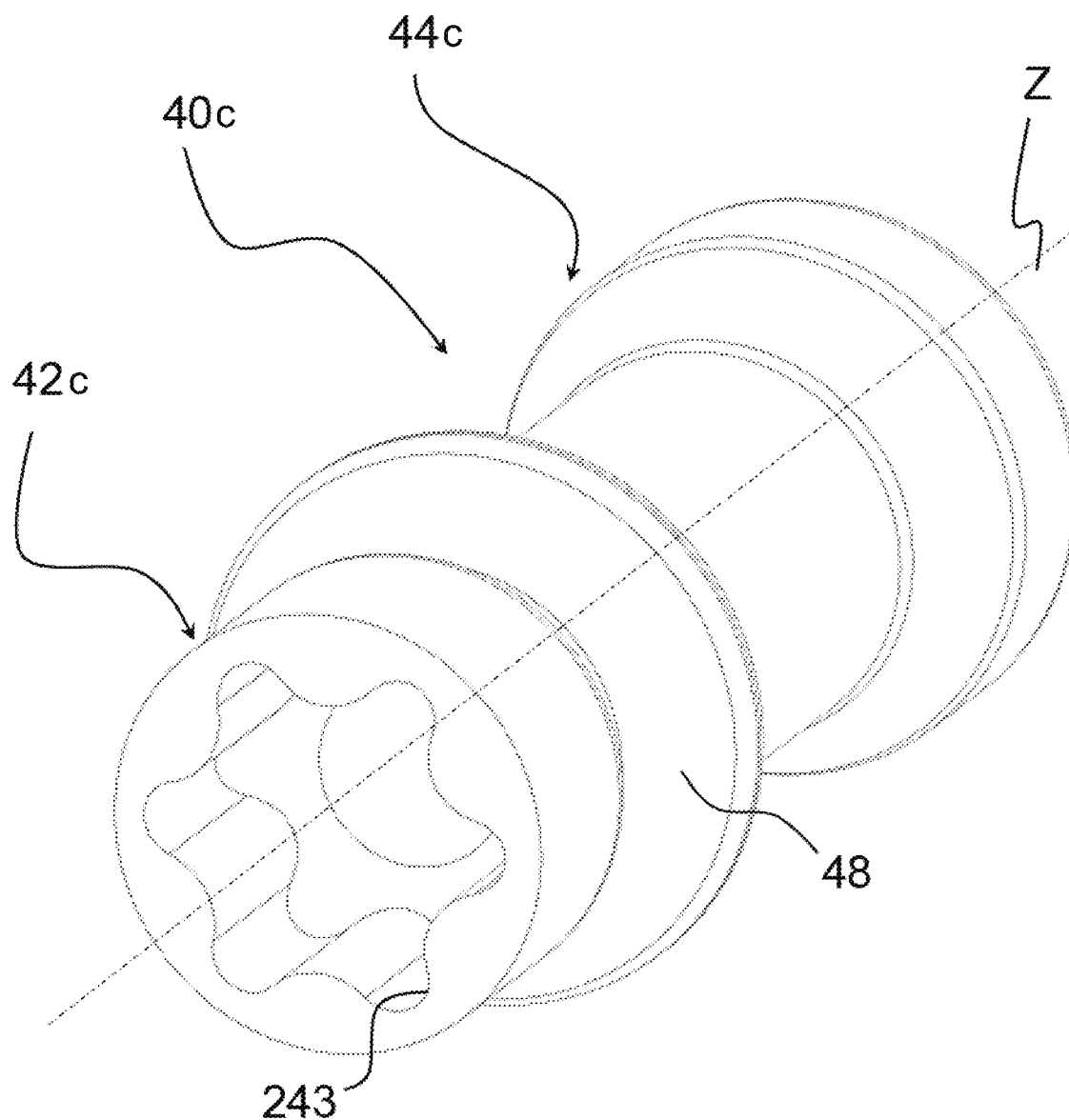
FIG. 15 is a perspective view of a third embodiment of a spoke attachment element used in the wheel according to the present invention.
Figures 16, 17:
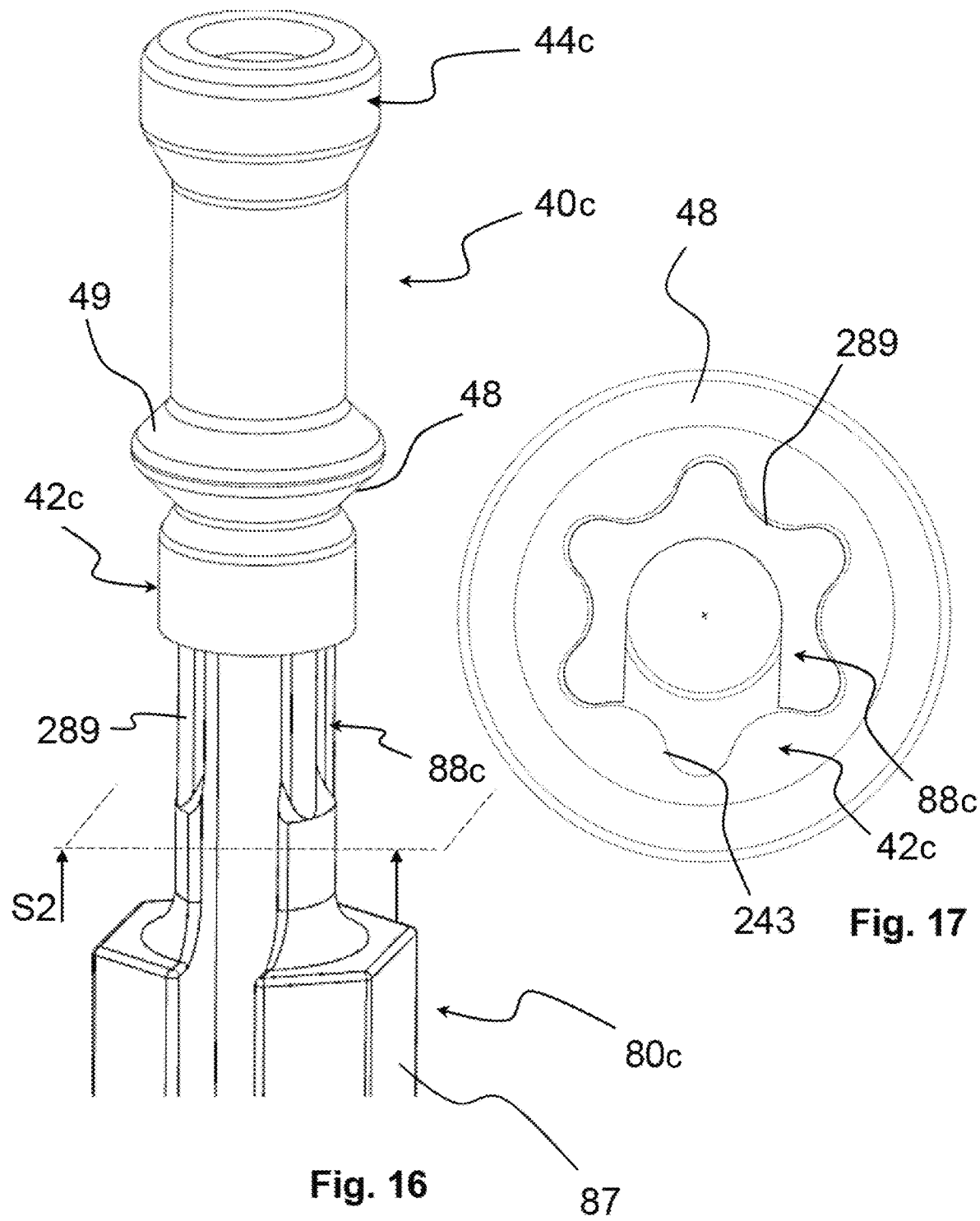
FIG. 16 is a perspective view of the spoke attachment element of FIG. 15 with which a third embodiment of an adjustment tool for adjusting the tension of a spoke is partially coupled.
FIG. 17 is a cross section view of the spoke attachment element and of the tool shown in FIG. 16, the cross section being taken at the section plane S2 of FIG. 16.

The stem 42*c* of the spoke attachment element 40*c* of FIGS. 15-17, conversely, unlike that of the spoke attachment element 40*a* of FIGS. 7-10 and that of the spoke attachment element 40*b* of FIGS. 11-14, comprises an inner toothing 243, extending parallel to a longitudinal axis Z of the spoke attachment element 40*c*. Preferably, the inner toothing 243 has a curved profile. In the non-limiting example illustrated the outer inner toothing 243 comprises six teeth and six valleys. The spoke attachment element 40*c* includes an enlarged head 44*c*.

The shaped end portion 88*c* comprises a toothed outer surface 289, extending parallel to the longitudinal axis Y of the elongated body 82. The toothed outer surface 289 has a shape matching that of the inner toothing 243 (FIG. 17).

The toothed outer surface 289 has for example a longitudinal extension comprised between about 2 mm and 4 mm.

FIGS. 18-23 illustrate five further embodiments of a spoked wheel 100*d*, 100*e*, 100*f*, 100*g*, 100*h* for bicycle according to the present invention.

In FIGS. 18-23 the components and the portions of the wheel 100*d*, 100*e*, 100*f*, 100*g*, 100*h* analogous or functionally equivalent to those of the wheel 100 of FIGS. 1-5 are indicated with the same reference numeral and reference is made to the relative description made above.

Figure 18:
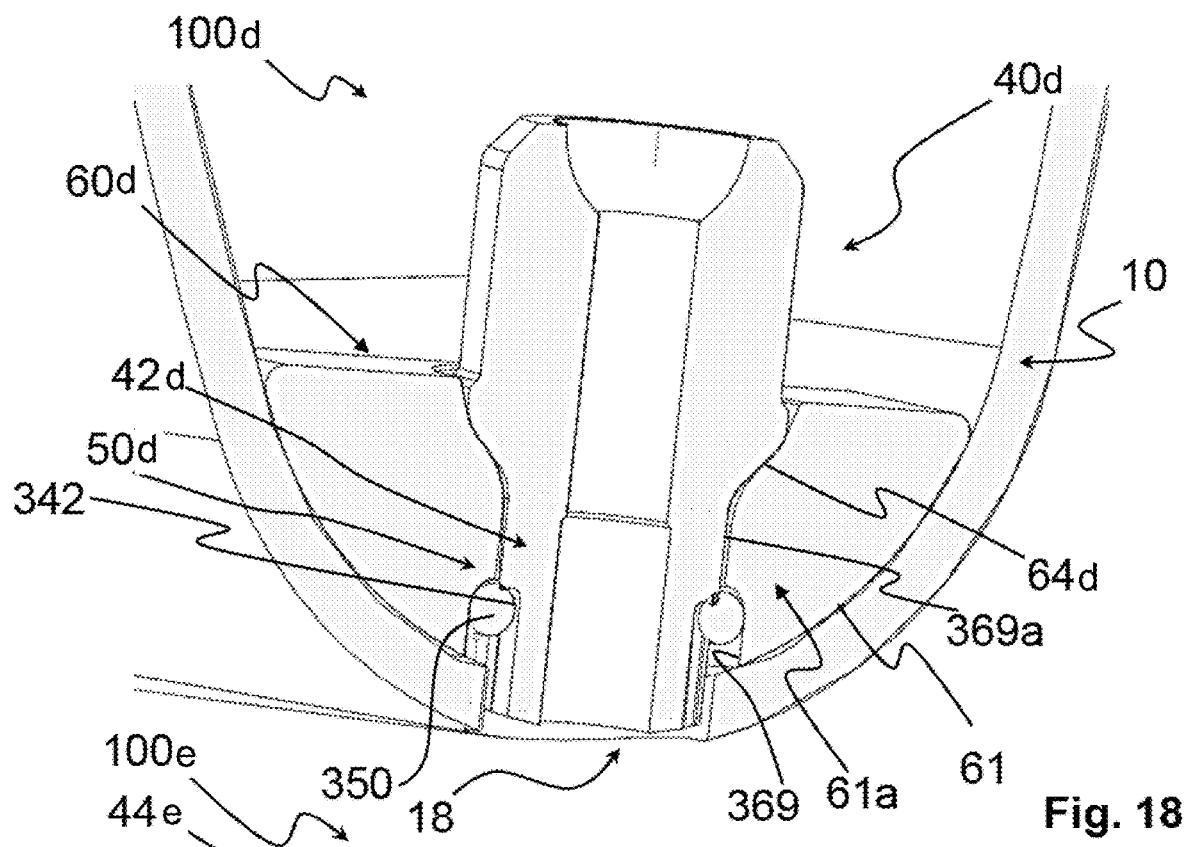
FIGS. 18-22 are perspective views in axial section of five variant embodiments of a spoke attachment element and of an insert used in the wheel according to the present invention, the sections being taken at a spoke attachment hole.

Unlike the wheel 100 of FIGS. 1-5, in the wheel 100*d* of FIG. 18 the holding element 50*d* is defined by an O-ring 350 arranged in a circumferential seat 369 formed in the insert 60*d*.

The circumferential seat 369 is arranged adjacent to an undercut annular surface 369*a* of the insert 60*d*. In particular, the circumferential seat 369 is arranged in a radially inner position with respect to the undercut annular surface 369*a*.

The circumferential seat 369 is arranged at the through hole 62 and is defined in a first portion 61*a* of the insert 60*d* comprising the first surface portion 61. The portion of abutment surface 64*d* is arranged in a radially outer position with respect to the undercut annular surface 369*a*.

The O-ring 350 is also arranged in a circumferential seat 342 formed in the spoke attachment element 40*d*. The circumferential seat 342 is formed on the stem 42*d* of the spoke attachment element 40*d*.

In FIG. 18 the holding surface 49 is defined at the circumferential seat 342 formed on the stem 42*d* of the spoke attachment element 40*d*.

In order to make this embodiment it is necessary that in the moulding step of the rim 10 the area of the circumferential seat 342 is protected from possible infiltrations of moulding resin. It must also be ensured that the geometry of the rim 10 is maintained.

For this reason, a suitable shaped protective insert is inserted in the mould inside the through hole 62 of the insert 60*d*. After moulding it can be removed by breaking it.

The subsequent mounting steps of the wheel 100*d* comprise the mounting of the O-ring 350 on the spoke attachment element 40*d*, the insertion of the spoke attachment element 40*d* with the O-ring 350 in the insert 60*d* and finally the mounting of the spokes 30 as described above.

In the case of replacement of the spoke attachment element 40*d*, the O-ring 350 is extracted from the circumferential seat 342 and replaced with a new one.

Figure 19:
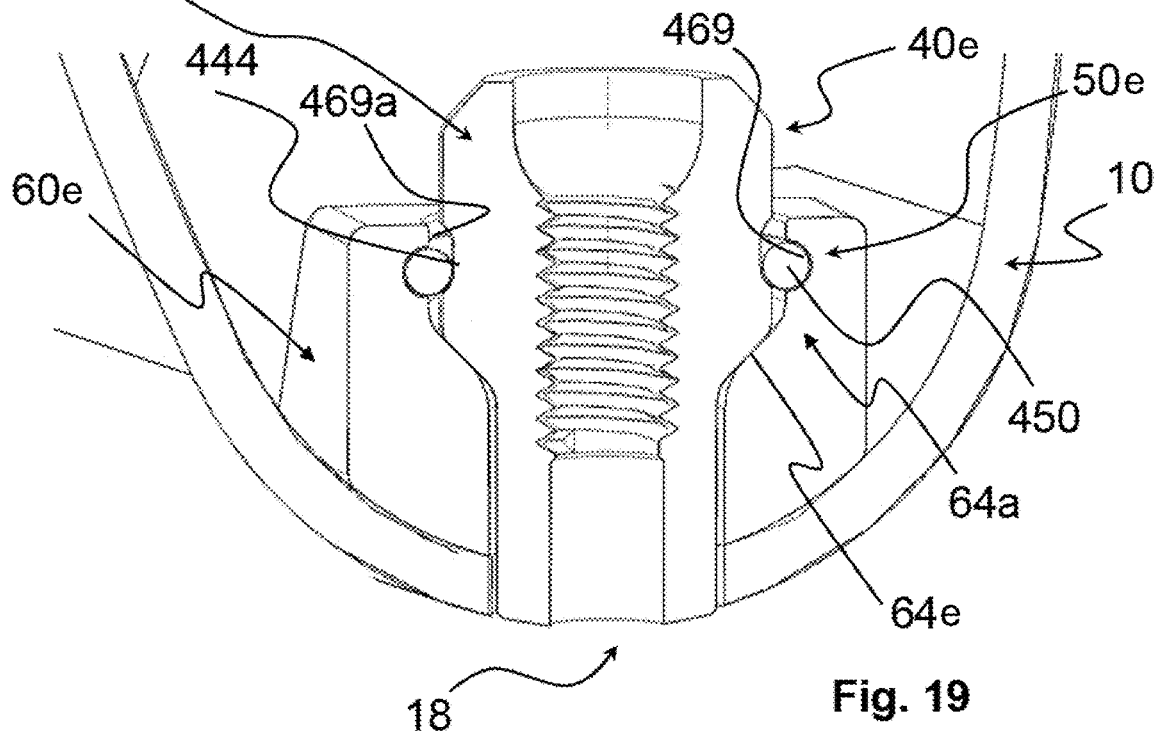

Unlike the wheel 100 of FIGS. 1-5, in the wheel 100*e* of FIG. 19 the holding element 50*e* is defined by an O-ring 450 arranged in a circumferential seat 469 formed in the insert 60*e*.

The circumferential seat 469 is arranged adjacent to an undercut annular surface 469*a* of the insert 60*e*. In particular, the circumferential seat 469 is arranged in a radially inner position with respect to the undercut annular surface 469*a*.

The circumferential seat 469 is arranged at the through hole 62 and is defined in a second portion 64*a* of the insert 60*e* comprising the surface portion 64*e*. The surface portion 64*e* is arranged in a radially inner position with respect to the circumferential seat 469.

The O-ring 450 is also arranged in a circumferential seat 444 formed in the spoke attachment element 40*e*. The circumferential seat 444 is formed on the enlarged head 44*e* of the spoke attachment element 40*e*.

The O-ring 450 has an outer diameter greater than the O-ring 350.

In FIG. 19 the holding surface 49 is defined at the circumferential seat 444 formed on the enlarged head 44*e* of the spoke attachment element 40*e*.

The insert 60*e* of this embodiment of the invention can be made by a sintering process or by a 3D printing.

Figure 20:
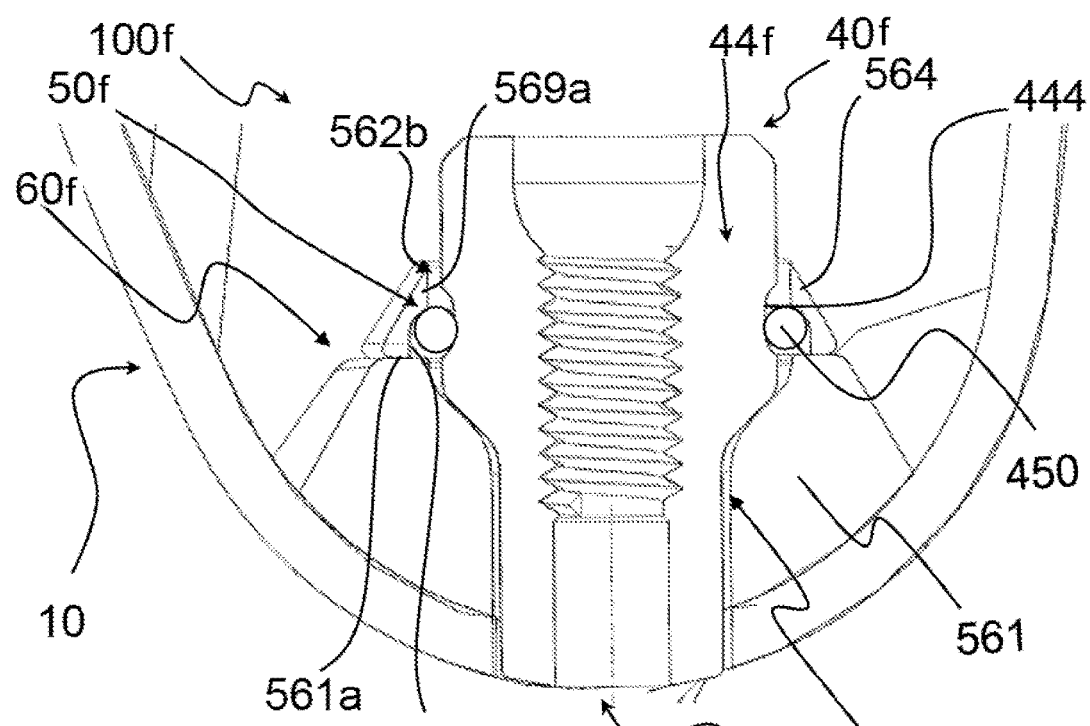

The wheel 100*f* of FIG. 20 differs from the wheel 100*e* of FIG. 19 substantially in that the insert 60*f* of FIG. 20 is not in a single piece but comprises a main body 561 and an auxiliary body 564.

A first through hole 562*a* is made on the main body 561. The auxiliary body 564 is coupled with a radially outer surface 561*a* of the main body 561 and has a second through hole 562*b* arranged coaxially to the first through hole 562*a*.

The through hole 62 of the insert 60*f* is therefore defined by the first through hole 562*a* and by the second through hole 562*b*.

The holding element 50*f* is defined by the O-ring 450 arranged in a circumferential seat 569 formed in the auxiliary body 564 in an adjacent position (in particular, in a radially inner position) with respect to an undercut annular surface 569*a* of the auxiliary body 564.

The O-ring 450 is also arranged in a circumferential seat 444 formed in the spoke attachment element 40*f*. The circumferential seat 444 is formed on the enlarged head 44*f* of the spoke attachment element 40*f*.

In FIG. 20 the holding surface 49 is defined at the circumferential seat 444 formed on the enlarged head 44*f* of the spoke attachment element 40*f*.

In this embodiment the locking of the auxiliary body 564 in the moulding step can be carried out by overlapping one or more sheets of carbon fiber.

Figure 21:
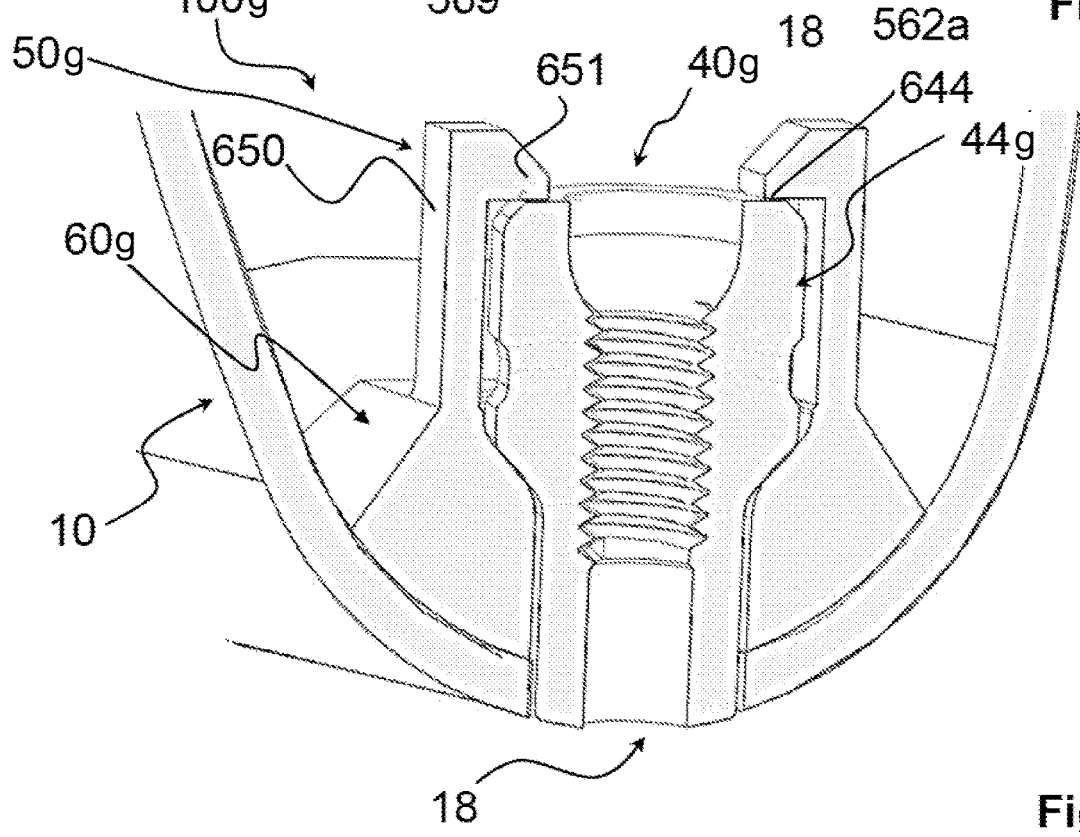

The wheel 100*g* of FIG. 21 differs from the wheel 100*e* of FIG. 19 substantially in that the insert 60*g* of FIG. 21 comprises a pair of hooking arms 650 that extend parallel to the longitudinal axis X (and therefore in the radial direction) and each comprising a folded radially outer free end portion 651, defining a respective holding element 50*g*.

The folded free end portion 651 holds the enlarged head 44*g* of the spoke attachment element 40*g* at a radially outer surface 644 thereof, which is substantially flat.

In FIG. 21 the holding surface 49 is defined at the radially outer surface 644 of the enlarged head 44*g* of the spoke attachment element 40*g*.

In this embodiment a "snap" coupling is obtained thanks to the elasticity of the material with which the insert 60*g* is made.

Figure 22:
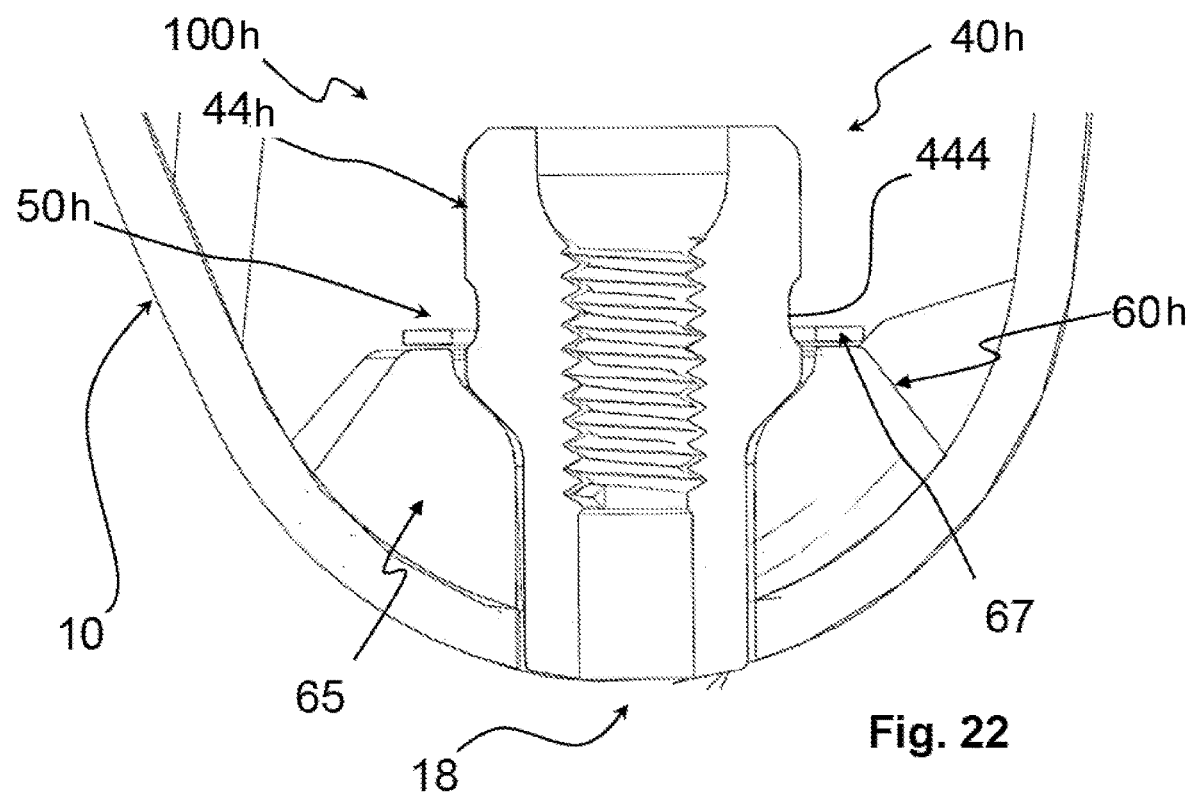
Figure 23:
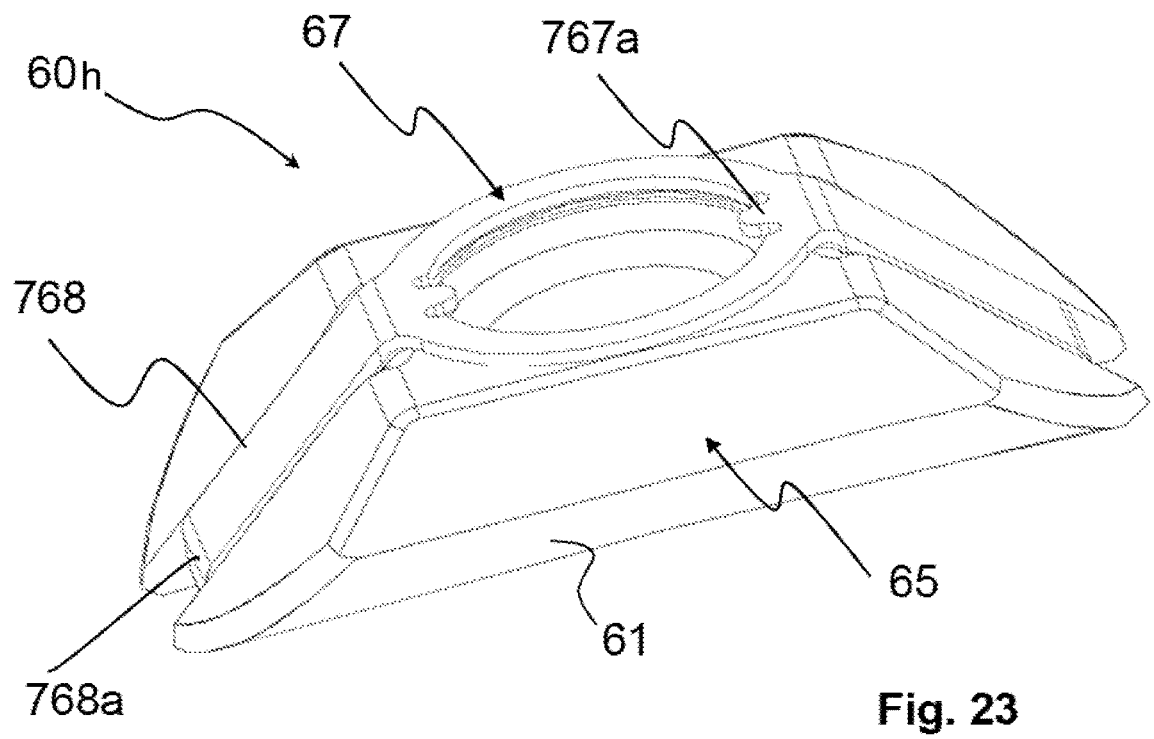
FIG. 23 is a perspective view of the insert of FIG. 22.

The wheel 100*h* of FIGS. 22 and 23 differs from the wheel 100 of FIGS. 1-5 substantially in that the annular element 67 of the insert 60*h* of FIGS. 22 and 23 comprises a pair of hooking arms 768 each having a folded radially inner free end portion 768*a* configured to couple with a radially inner surface of the main body 65 of the insert 60*h*.

The holding element 50*h* of the insert 60*h* of FIGS. 22 and 23 is defined by the flexible portion 767*a* of the annular element 67 that projects cantilevered in the through hole 62.

As illustrated in FIG. 23, the flexible portion 767*a* is defined by two opposite tongues facing towards the through hole 62.

The flexible portion 767*a* is arranged in a circumferential seat 444 formed in the spoke attachment element 40*h*. The circumferential seat 444 is formed on the enlarged head 44*h* of the spoke attachment element 40*h*.

In FIG. 22 the holding surface 49 is defined at the circumferential seat 444 formed on the enlarged head 44*h* of the spoke attachment element 40*h*.

Also in this embodiment it is advisable to ensure that there is no contact between the carbon fiber of the rim 10 and the metallic material of the annular element 67. It is also advisable to prevent that there are infiltrations of moulding resin during the moulding of the rim 10 both in the passage area of the spoke attachment element 40*h*, and under the flexible portion 767*a*.

Of course, those skilled in the art can bring numerous modifications and variants to the present invention as described above, in order to satisfy specific and contingent requirements, all of which are in any case within the scope of protection defined by the following claims In particular, it is possible to provide for any combination of the features disclosed with reference to the embodiments and variants described.

For example, the upper bridge of the rim may or may not comprise further perforations in addition to that for the inflation valve of the tyre/air chamber.

Furthermore, it is possible to provide systems configured to avoid the unscrewing of the spoke attachment element 40, 40*a*, 40*b*, 40*c*, 40*d*, 40*e*, 40*f*, 40*g*, 40*h* from the spoke 30 (due in particular to vibrations). For example it is possible to use glues between the threads of the threaded end portion 32 of the spoke 30 and the threaded through hole 46*a* or at the top of the threaded end portion 32 of the spoke 30, and in particular in the threaded through hole 46*a*, it is possible to insert a perforated ball 95, for example made from nylon (as illustrated in FIG. 3).

The spoke attachment element 40, 40*a*, 40*b*, 40*c*, 40*d*, 40*e*, 40*f*, 40*g*, 40*h* can also be made from aluminum.

What is claimed is:

1. An insert for a rim of a spoked wheel for bicycle, comprising:
   a first surface portion configured to abut against an inner surface of a rim at a spoke attachment hole of the rim,
   a through hole extending along a longitudinal axis (X) and configured to receive a spoke attachment element,
   a second surface portion configured to abut against an enlarged head of the spoke attachment element, and
   a main body with a first through hole and an annular element that is distinct from the main body and coupled with the main body, the annular element having a second through hole arranged coaxially with the first through hole, the through hole of the insert being defined by the first and second through holes,
   wherein at least one holding element prevents movement of said spoke attachment element along said longitudinal axis (X) when said spoke attachment element abuts against said second surface portion,
   wherein said at least one holding element is defined by at least one flexible portion of said annular element that projects into said second through hole, said at least one flexible portion being folded by the spoke attachment element during insertion of the spoke attachment element in the through hole and returning to an unfolded configuration to hold said spoke attachment element after insertion of the spoke attachment element.

2. The insert according to claim 1, wherein said at least one flexible portion of said annular element is coated with rubber.

3. The insert according to claim 1, wherein said annular element is a metallic.

4. The insert according to claim 1, wherein said annular element is substantially flat and is co-molded on said main body.

5. The insert according to claim 1, wherein said annular element is substantially flat and is locked on said main body through at least one covering layer comprising carbon fibers.

6. The insert according to claim 1, wherein at least one insulating layer comprising glass fibers is interposed between said main body and said annular element.

7. The insert according to claim 1, comprising a pair of hooking arms with portions that extend parallel to said longitudinal axis (X) and end portions that are substantially perpendicular to said longitudinal axis (X) and that define a respective holding element.

8. The insert according to claim 1, wherein said annular element includes a pair of hooking arms, each arm having a free end portion configured to couple with said main body.

9. A spoked wheel for bicycle, comprising:
   a rim made at least partially from composite material and provided with a plurality of spoke attachment holes;
   a plurality of spokes coupled with the rim at said spoke attachment holes;
   a spoke attachment element arranged at a respective spoke attachment hole; and,
   at least one insert according to claim 1 that is in abutment against an inner surface of said rim.

10. The wheel according to claim 9, wherein said spoke attachment element is partially inserted in said spoke attachment hole and does not project radially from the rim internally with respect to the rim.

11. The wheel according to claim 9, wherein said spoke attachment element is partially inserted in said spoke attachment hole and comprises a radially inner end portion that projects radially from the rim internally with respect to the rim by a segment having a length shorter than or equal to a diameter of the spoke at said spoke attachment hole.

12. An insert for a rim of a spoked wheel for bicycle, the insert comprising:
   a first surface portion configured to abut against an inner surface of a rim at a spoke attachment hole of the rim,
   a through hole extending along a longitudinal axis (X) and configured to receive a spoke attachment element, and
   a second surface portion configured to abut against an enlarged head of the spoke attachment element,
   wherein said insert has at least one holding element configured to prevent movement of said spoke attachment element along said longitudinal axis (X) when said spoke attachment element abuts against said second surface portion,
   wherein said at least one holding element is defined by an O-ring arranged in a circumferential seat formed in a position adjacent to an undercut annular surface of said insert, the circumferential seat being arranged in a radially inner position with respect to the undercut annular surface.

13. The insert according to claim 12, wherein said circumferential seat is defined at a first portion of said insert comprising said first surface portion or at a second portion of said insert comprising said second surface portion.

14. A spoked wheel for bicycle, comprising:
   a rim made at least partially from composite material and provided with a plurality of spoke attachment holes;
   a plurality of spokes coupled with the rim at said spoke attachment holes;
   a spoke attachment element arranged at a respective spoke attachment hole; and,
   at least one insert according to claim 12 that is in abutment against an inner surface of said rim.

15. An insert for a rim of a spoked wheel for bicycle, the insert comprising:
   a first surface portion configured to abut against an inner surface of a rim at a spoke attachment hole of the rim,
   a through hole extending along a longitudinal axis (X) and configured to receive a spoke attachment element,
   a second surface portion configured to abut against an enlarged head of the spoke attachment element,
   wherein said insert has at least one holding element configured to prevent movement of said spoke attachment element along said longitudinal axis (X) when said spoke attachment element abuts against said second surface portion, and
   a main body on which a first through hole is made and an auxiliary body is coupled with said main body and has a second through hole arranged coaxially to said first through hole, the through hole of the insert being defined by the first and second through holes, wherein said at least one holding element is defined by an O-ring arranged in a circumferential seat formed in said auxiliary body in a position adjacent to an undercut annular surface of said auxiliary body.

16. A spoked wheel for bicycle, comprising:
   a rim made at least partially from composite material and provided with a plurality of spoke attachment holes;
   a plurality of spokes coupled with the rim at said spoke attachment holes;
   a spoke attachment element arranged at a respective spoke attachment hole; and,
   at least one insert according to claim 15 that is in abutment against an inner surface of said rim.

* * * * *